United States Patent
Hirata et al.

(10) Patent No.: US 10,279,782 B2
(45) Date of Patent: May 7, 2019

(54) WHEEL CLEANING SYSTEM FOR AUTONOMOUS DRIVING APPARATUS, CONTROL METHOD FOR AUTONOMOUS DRIVING APPARATUS AND AUTONOMOUS DRIVING APPARATUS

(71) Applicant: Sharp Kabushiki Kaisha, Osaka (JP)

(72) Inventors: Kiyotaka Hirata, Osaka (JP); Kyosuke Taka, Osaka (JP); Tetsushi Ito, Osaka (JP); Masatoshi Tomomasa, Osaka (JP); Atsushi Higuchi, Osaka (JP); Kosuke Tanaka, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/055,667

(22) Filed: Feb. 29, 2016

(65) Prior Publication Data
US 2016/0339879 A1 Nov. 24, 2016

(30) Foreign Application Priority Data

May 20, 2015 (JP) ................................. 2015-102870

(51) Int. Cl.
*A47L 11/00* (2006.01)
*B60S 3/04* (2006.01)

(52) U.S. Cl.
CPC ..................................... *B60S 3/042* (2013.01)

(58) Field of Classification Search
None
See application file for complete search history.

(56) References Cited

U.S. PATENT DOCUMENTS

| | | | | |
|---|---|---|---|---|
| 6,633,150 B1 * | 10/2003 | Wallach | .................. | A47L 9/009 15/21.1 |
| 7,272,868 B2 * | 9/2007 | Im | ........................... | A47L 9/009 15/319 |
| 8,800,101 B2 * | 8/2014 | Kim | ...................... | A47L 9/2805 15/319 |
| 2005/0132522 A1 * | 6/2005 | Im | ........................... | A47L 9/009 15/319 |
| 2005/0137749 A1 * | 6/2005 | Jeon | ...................... | G05D 1/0225 700/245 |
| 2007/0204426 A1 * | 9/2007 | Nakagawa | ................. | A47L 7/02 15/348 |
| 2007/0272463 A1 * | 11/2007 | Yu | .............................. | B60T 7/22 180/167 |

(Continued)

FOREIGN PATENT DOCUMENTS

| JP | H08-020315 A | 1/1996 |
|---|---|---|
| JP | 2004-067060 A | 3/2004 |

(Continued)

*Primary Examiner* — Truc M Do
(74) *Attorney, Agent, or Firm* — ScienBiziP, P.C.

(57) ABSTRACT

A wheel cleaning system for an autonomous driving apparatus includes the autonomous driving apparatus with wheels, capable of driving autonomously based on peripheral information, and a cleaning area for cleaning the wheels. The cleaning area has a cleaning mat for cleaning the wheels as the wheels turn to rub against the mat. The autonomous driving apparatus has a controller for controlling an operation of the autonomous driving apparatus so as to perform a cleaning process of the wheels in the cleaning area.

14 Claims, 18 Drawing Sheets

(56) References Cited

U.S. PATENT DOCUMENTS

| | | | | |
|---|---|---|---|---|
| 2008/0206092 A1* | 8/2008 | Crapser | A47L 11/24 | 422/5 |
| 2008/0249661 A1* | 10/2008 | Hong | A47L 9/009 | 700/252 |
| 2010/0106298 A1* | 4/2010 | Hernandez | G05D 1/0217 | 700/250 |
| 2012/0065830 A1* | 3/2012 | Ko | A47L 9/009 | 701/26 |
| 2013/0025085 A1* | 1/2013 | Kim | A47L 9/2805 | 15/319 |
| 2013/0030750 A1* | 1/2013 | Kim | G06N 3/004 | 702/108 |
| 2013/0138246 A1* | 5/2013 | Gutmann | G05D 1/0231 | 700/253 |
| 2013/0146090 A1* | 6/2013 | Ko | G05D 1/021 | 134/18 |
| 2013/0305481 A1* | 11/2013 | Jung | A47L 9/106 | 15/301 |
| 2014/0048098 A1* | 2/2014 | Prahlad | A47L 25/005 | 134/1 |
| 2014/0076226 A1* | 3/2014 | Smith | B63B 59/10 | 114/222 |
| 2014/0152075 A1* | 6/2014 | Kanatani | B60K 7/0007 | 301/6.5 |
| 2014/0371909 A1* | 12/2014 | Lee | G05D 1/0016 | 700/259 |

FOREIGN PATENT DOCUMENTS

| | | |
|---|---|---|
| JP | 2007-121226 A | 5/2007 |
| JP | 2008-213568 A | 9/2008 |
| JP | 2009-172289 A | 8/2009 |
| JP | 2009172289 A * | 8/2009 |

* cited by examiner

WHEEL CLEANING SYSTEM FOR AUTONOMOUS DRIVING APPARATUS, CONTROL METHOD FOR AUTONOMOUS DRIVING APPARATUS AND AUTONOMOUS DRIVING APPARATUS

This Nonprovisional application claims priority under 35 U.S.C. § 119 (a) on Patent Application No. 2015-102870 filed in Japan on 20 May 2015, the entire contents of which are hereby incorporated by reference.

BACKGROUND OF THE INVENTION (1) Field of the Invention

The present invention relates to a wheel cleaning system for an autonomous driving apparatus having wheels and capable of driving autonomously based on peripheral information, a control method for the autonomous driving apparatus and the autonomous driving apparatus.

(2) Description of the Prior Art

Since wheels of a vehicle are soiled as the vehicle travels outdoors, conventionally there have been demands for measures to clean wheels.

As the prior art, there has been disclosed a method of cleaning tires of a wheelchair by bringing brushes into contact with the tires (see Patent Document 1).

There has been another disclosure of a method to clean wheels for autonomous driving vehicle in which an autonomous driving vehicle is placed on a cleaning mat with its wheels (contact part to the ground) floated and the wheels are cleaned by idling the wheels while putting the wheels in contact with soft hairs of the cleaning mat (see Patent Document 2).

As another method of cleaning tires, there is a disclosure of a method of cleaning tires in which, with rollers having projections abutted against wheels, both the wheels and rollers are turned so that the projections rub the wheels thanks to the differential rotational speed between the wheels and one roller (see Patent Document 3).

[Patent Document 1]
  Japanese Patent Application Laid-open 2009-172289
[Patent Document 2]
  Japanese Patent Application Laid-open 2008-213568
[Patent Document 3]
  Japanese Patent Application Laid-open 2004-67060

However, the technology of Patent Document 1 is configured such that the wheels of the wheelchair are rotated at a fixed position and cleaned with the brushes that are easy to perform maintenance such as replacement thereof, and is suitable to clean a large number of wheelchairs one by one. However, since the wheelchair needs to be set at the cleaning position and a worker is needed, there have been demands for unmanned cleaning methods.

As to the technologies of Patent Documents 2 and 3, either of these is a cleaning method of wheels (tires), and needs to set the vehicle to the cleaning machine to perform a cleaning operation. Accordingly, there is a problem that the vehicle after completion of cleaning has to pass back to the route through which the vehicle was brought to or accessed to the cleaning machine, hence ends up getting soiled once again.

SUMMARY OF THE INVENTION

The present invention has been devised in view of the above conventional problems, it is therefore an object of the invention to provide a wheel cleaning system for autonomous driving apparatus, which has a simple structure and still can clean the wheels so as not to get soiled again, without use of any cleaning device when the autonomous driving apparatus that has driven outdoors enters an indoor area, as well as providing control method for the autonomous driving apparatus and the autonomous driving apparatus.

In order to achieve the above object, the wheel cleaning system for autonomous driving apparatus, a control method for the autonomous driving apparatus and the autonomous driving apparatus are as follows:

The first aspect of the present invention resides in a wheel cleaning system for an autonomous driving apparatus, comprising: an autonomous driving apparatus including wheels and being capable of driving autonomously based on peripheral information; and, a cleaning area for cleaning the wheels of the autonomous driving apparatus, wherein the autonomous driving apparatus includes a control unit for controlling an operation of the autonomous driving apparatus so as to perform a cleaning process of the wheels in the cleaning area.

The second aspect of the present invention prefers to have a position detecting device for detecting positional information on the autonomous driving apparatus, wherein the control unit includes an area determinator for determining where the autonomous driving apparatus is residing among an outdoor area, an indoor area and a cleaning area, based on a detected result of the position detecting device, and the control unit controls the autonomous driving apparatus so as to perform the cleaning process in the cleaning area before the autonomous driving apparatus enters the indoor area from the outdoor area.

The third aspect of the present invention prefers that the cleaning area is provided between the outdoor area and the indoor area, and the control unit has a cleaning mode for performing the cleaning process and performs the cleaning mode when the autonomous driving apparatus enters the cleaning area.

The fourth aspect of the present invention prefers that the cleaning area has a rubbing member for cleaning the wheels as the wheels turn to rub against the rubbing member.

The fifth aspect of the present invention prefers that the cleaning process includes an operation to rub an entire circumference of the wheels by making the autonomous driving apparatus turn round at a fixed position on the rubbing member.

In the present invention, the method of performing a turn at a fixed position (turn at the same position) may use a skid-steering mechanism by turning the left and right wheels in opposite directions relative to each other. According to the autonomous driving apparatus with this skid-steering mechanism, it is possible to rotate the apparatus in a limited space without needing a large turning area in turning.

The sixth aspect of the present invention prefers that the autonomous driving apparatus includes a dirt detector for detecting dirt of the wheels, the control unit includes a dirt determinator for determining whether or not a detected value of the dirt of the wheels is equal to or lower than a predetermined value being set beforehand, based on a detected result of the dirt detector, and the control unit repeats the cleaning process if the detected value of the dirt of the wheels is not equal to or lower than the predetermined value after the cleaning process has been performed in the cleaning area.

Here, in the present invention, "dirt" of the wheels may include a state in which foreign material is adhering to the wheels, a state in which the wheels are being wetted and a state in which the surface of the wheels is in an anomaly condition.

The seventh aspect of the present invention prefers that the autonomous driving apparatus includes a dirt detector for detecting dirt of the wheels, the cleaning process has a plurality of cleaning modes (an intermittent turn at a fixed position; a turn switching of a direction of the turn; and a turn switching of a speed of the turn) in accordance with a dirt state of the wheels, and, the control unit includes: a dirt determinator for determining the dirt state on the wheels based on a detected result of the dirt detector; a cleaning mode determinator for determining the cleaning mode to be performed in accordance with the dirt state on the wheels, based on a determined result of the dirt determinator; and a cleaning operation controller for controlling the operation of the autonomous driving apparatus in accordance with the cleaning mode determined by the cleaning mode determinator.

The eighth aspect of the present invention prefers that the cleaning process has a plurality of cleaning modes in accordance with weather information on the outdoor area, the control unit includes an acquisition function of weather information on the outdoor area, and, the cleaning mode determinator has a function for determinating the cleaning mode to be performed in accordance with the weather information.

The ninth aspect of the present invention resides in a control method of an autonomous driving apparatus having wheels and being capable of driving autonomously based on peripheral information, comprising the step of performing a cleaning process for cleaning the wheels as the autonomous driving apparatus turns the wheels and rubs the wheels against a rubbing member in a cleaning area for cleaning the wheels of the autonomous driving apparatus.

The tenth aspect of the present invention resides in an autonomous driving apparatus having wheels and being capable of driving autonomously based on peripheral information, comprising: a control unit for controlling an operation of the autonomous driving apparatus so as to perform a cleaning process of the wheels in accordance with a change of a driving environment of the autonomous driving apparatus.

The eleventh aspect of the present invention refers that the change of the driving environment is a change of a road surface.

The twelfth aspect of the invention refers to have a position detector for detecting positional information on the autonomous driving apparatus, wherein the control unit includes an area determinator for determining where the autonomous driving apparatus is residing among an outdoor area and an indoor area, based on a detected result of the position detector, and the control unit controls the autonomous driving apparatus so as to perform the cleaning process before the autonomous driving apparatus enters the indoor area from the outdoor area.

The thirteenth aspect of the present invention refers that the cleaning process has an operation selected from the group consisting of an intermittent turn at a fixed position; a turn switching of a direction of the turn; and a turn switching of a speed of the turn.

The fourteenth aspect of the invention resides in a non-transitory recording medium recording a program for causing a computer to execute: a step of making an autonomous driving apparatus drive autonomously based on peripheral information; and, a step of cleaning wheels of the autonomous driving apparatus as the autonomous driving apparatus turns the wheels and rubs the wheels against a rubbing member in a cleaning area for cleaning the wheels of the autonomous driving apparatus.

Advantages of the Invention

In accordance with the wheel cleaning system for the autonomous driving apparatuses of the present invention, it is possible to clean the wheels by rubbing the wheels against the cleaning member when, for example, the autonomous driving apparatus with the wheels soiled after travel from the outdoor area enters the indoor area. Accordingly, it is possible for the autonomous driving apparatus to clean the wheels with a simple arrangement without use of a dedicated cleaning device and enter the indoor area without making itself dirty once again.

In accordance with the control method of an autonomous driving apparatus of the present invention, it is possible to clean the wheels by rubbing the wheels against the cleaning member when, for example, the autonomous driving apparatus with the wheels soiled after travel from the outdoor area enters the indoor area. Accordingly, it is possible for the autonomous driving apparatus to clean the wheels with a simple arrangement without use of a dedicated cleaning device and enter the indoor area without making itself dirty once again.

In accordance with the non-transitory recording medium of the present invention, it is possible to clean the wheels by rubbing the wheels against the cleaning member when, for example, the autonomous driving apparatus with the wheels soiled after travel from the outdoor area enters the indoor area. Accordingly, it is possible for the autonomous driving apparatus to clean the wheels with a simple arrangement without use of a dedicated cleaning device and enter the indoor area without making itself dirty once again.

DESCRIPTION OF THE PREFERRED EMBODIMENTS

The First Embodiment

Now, the modes for carrying out the wheel cleaning system for autonomous driving apparatuses according to the present embodiment will be described with reference to the drawings.

Figure 1:
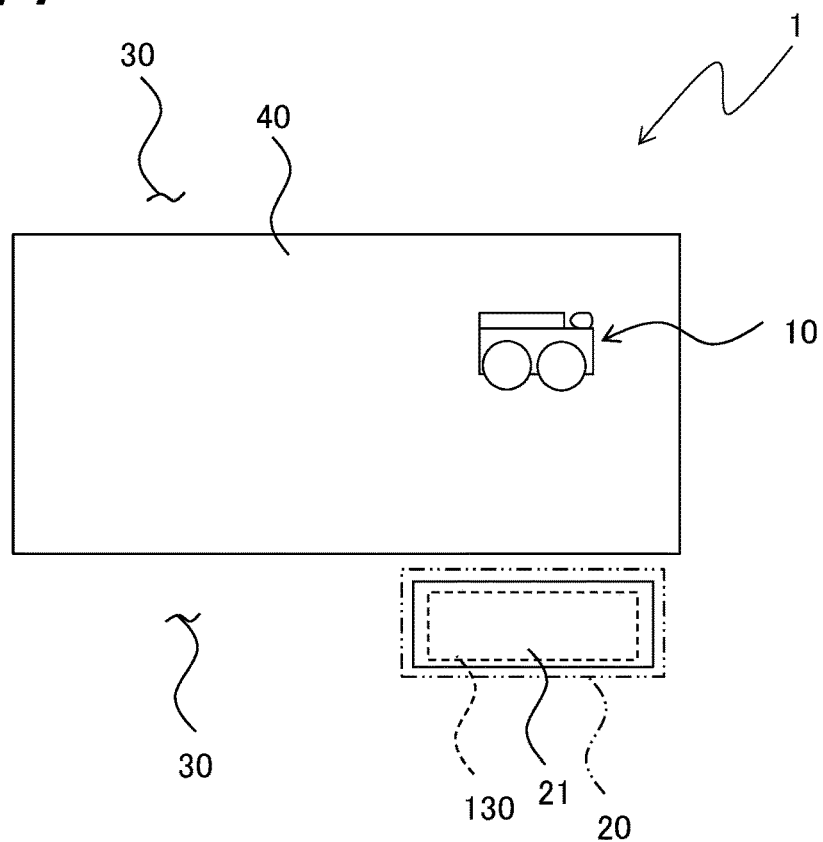
FIG. 1 is an illustrative diagram showing an overall configuration of a wheel cleaning system for autonomous driving apparatuses according to a first embodiment of the present invention.
Figure 2:
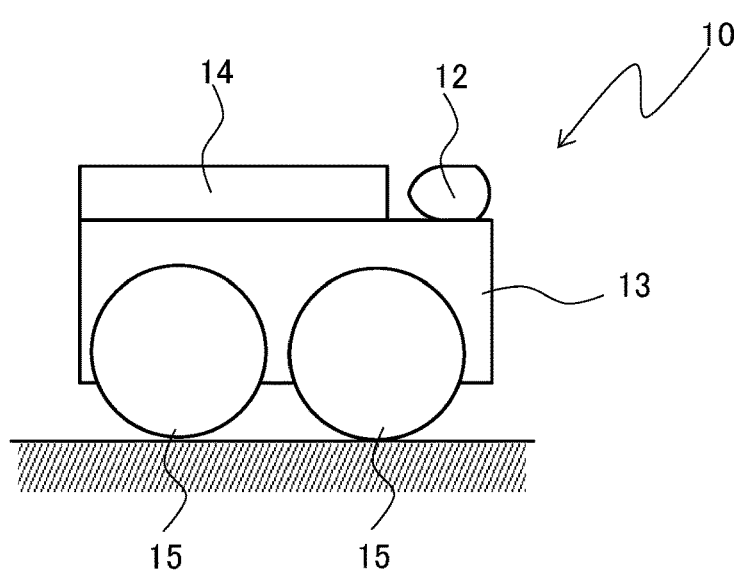
FIG. 2 is an illustrative diagram showing a configuration of the autonomous driving apparatus in the same wheel cleaning system.
Figure 3:
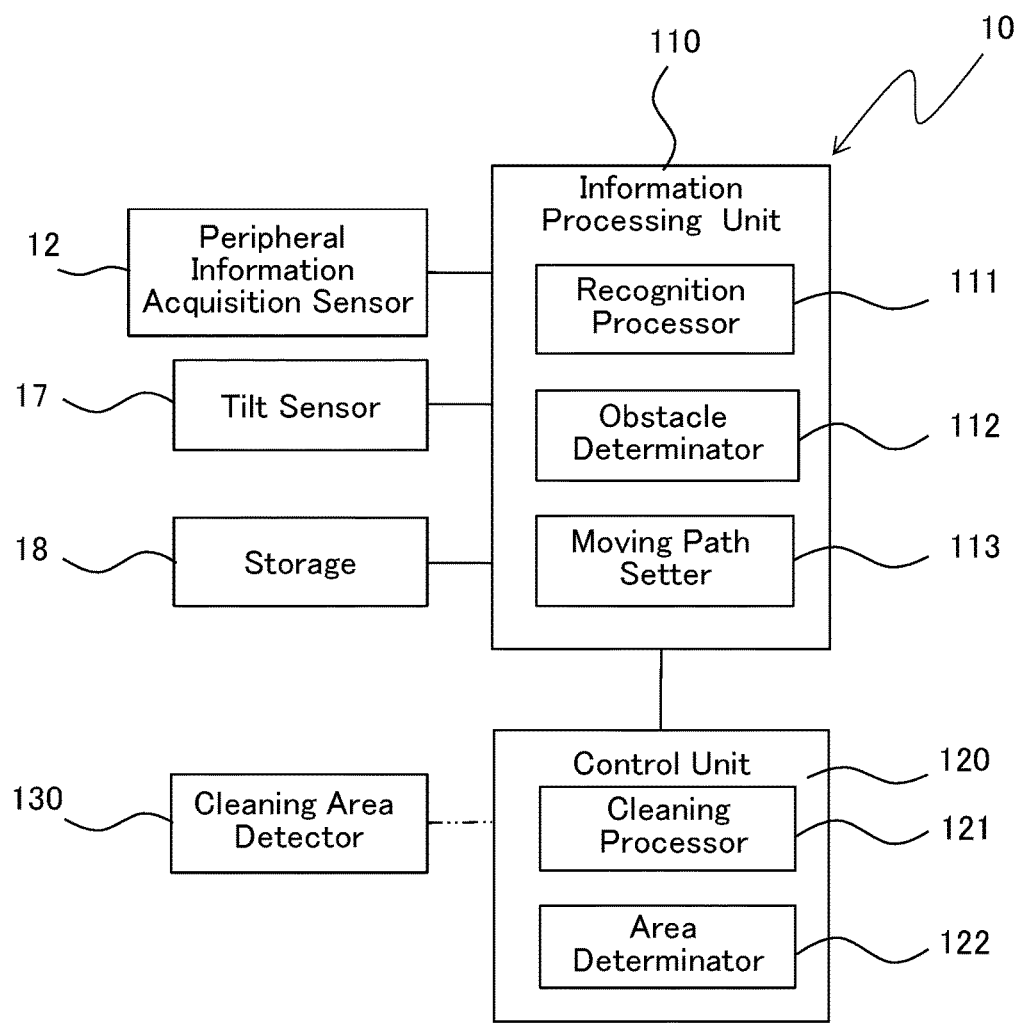
FIG. 3 is a block diagram showing an electric configuration of the autonomous driving apparatus.

FIG. 1 shows one example of the mode for carrying out the invention and is the illustrative diagram showing the overall configuration of the wheel cleaning system for the autonomous driving apparatus according to the first embodiment of the present invention. FIG. 2 is the illustrative diagram showing the configuration of the autonomous driving apparatus in the wheel cleaning system. FIG. 3 is the block diagram showing the electric configuration of the autonomous driving apparatus.

The wheel cleaning system 1 of the autonomous driving apparatus according to the first embodiment includes: as shown in FIGS. 1 and 2, an autonomous driving apparatus 10 with wheels 15, capable of driving autonomously based on peripheral information; and a cleaning area 20 for cleaning the wheels 15 of the autonomous driving apparatus 10. The cleaning area 20 has a cleaning mat (rubbing member) 21 for cleaning the wheels 15 by turning the wheels 15 on the cleaning mat and rubbing the wheels 15 against the cleaning mat. The wheel cleaning system 1 controls the operation of the autonomous driving apparatus 10 so as to perform a cleaning process of the wheels 15 in the cleaning area 20.

Herein, the autonomous driving apparatus is a device that drives autonomously, mechanically or by use of a program without depending on the judgment of a person, and is known for example, as an autonomous industrial transport vehicle for carrying objects inside factories, and the like.

In the wheel cleaning system 1 of the autonomous driving apparatus, when moving from an outdoor area 30 to an indoor area 40, the autonomous driving apparatus 10 is controlled so as to enter the indoor area 40 after the wheels 15 of the autonomous driving apparatus 10 has been cleaned up in the cleaning area 20, as shown in FIG. 1. Considered from a different angle, the autonomous driving apparatus 10 is able to perform the cleaning process when there is a change of a driving environment such as a movement of the autonomous driving apparatus from the outdoor area 30 to the indoor area 40.

As shown in FIG. 2, the autonomous driving apparatus 10 is configured to include a peripheral information acquisition sensor 12, a vehicle body (apparatus body) 13, a carrier 14 capable of carrying loads; and wheels (tires) 15 for driving. The wheels (tires) are not limited by the material, may be made of the material such as rubber, plastic, metal, for example.

Further, as shown in FIG. 3, the autonomous driving apparatus 10 includes: an information processing unit 110 for processing the peripheral information collected by the peripheral information collecting sensor 12; a control unit 120 for controlling the drive of autonomous driving apparatus 10 based on the peripheral information; and a storage 18 for storing the peripheral information collected by the peripheral information collecting sensor 12.

The peripheral information collecting sensor 12 uses a laser sensor.

A laser sensor radiates a laser beam from an emitter and detects the reflected beam that has been reflected on the surface of a target by means of a receiver, to thereby measure the distance to the target based on the time between laser beam emission and reception.

In the first embodiment, the autonomous driving apparatus 10 further includes a tilt sensor 17 for detecting the posture of the autonomous driving apparatus 10 as a detecting means, in addition to the peripheral information collecting sensor 12.

The tilt sensor 17 detects the state of posture of the autonomous driving apparatus 10, for example, tilt information such as up-down tilt, left- and right tilt, and the like. With this information, it is possible to grasp the peripheral information on the autonomous driving apparatus 10, more precisely.

The information collected by the peripheral information collecting sensor 12 and tilt sensor 17 is processed by the information processing unit 110.

The information processing unit 110 includes, as shown in FIG. 3, a recognition processor 111, an obstacle determinator 112 and a moving path setter 113.

Recognition processor 111 recognizes a position of peripheral information (objects, obstacles and the like).

The obstacle determinator 112 determines whether or not there is any obstacle ahead of the autonomous driving apparatus 10 by recognizing the peripheral information.

Moving path setter 113 determines a moving path of the autonomous driving apparatus 10 based on a recognition of the peripheral information by the recognition processor 111 and the judgment of the presence or absence of the obstacle by the obstacle determinator 112.

The control unit 120 includes a function (driving mode) of controlling the drive of the autonomous driving apparatus 10 and a function (cleaning mode) of executing a cleaning process for the wheels 15 in the cleaning area 20.

In the first embodiment, the control unit 120 includes a cleaning processor 121 and an area determinator (position detector) 122.

The cleaning processor 121 controls so that the autonomous driving apparatus 10 will perform the cleaning process in the cleaning area 20. The cleaning processor 121 has the cleaning mode for performing the cleaning process and, when the autonomous driving apparatus 10 enters the cleaning area 20, changes operation mode from the driving mode to the cleaning mode.

Examples of the cleaning mode may include a mode in which the apparatus is turned round at a fixed position in a fixed direction by skid-steering, a mode in which the apparatus is turned round at a fixed position while switching its rotational direction, a mode in which the apparatus is turned round at a fixed position intermittently, a mode in which the turning speed of the turn at the fixed position in the above-mentioned modes is varied, and others.

In the cleaning mode, a cleaning period of time may be configured to be set to be variable (selectable).

The area determinator (position detector) 122 determines whether or not the autonomous driving apparatus 10 resides in the cleaning area 20, based on the detected result of a cleaning area detector 130 mentioned later.

Next, the cleaning area 20 (FIG. 1) in the wheel cleaning system 1 will be described.

As shown in FIG. 1, the cleaning area 20 is a place provided between the outdoor area 30 and the indoor area 40 and is equipped with the cleaning area detector 130 and the cleaning mat (rubbing member) 21.

In the first embodiment, the cleaning area detector 130 has a coil (not shown) for detecting the autonomous driving apparatus 10 based on change of electromagnetic waves, and detects entrance of the autonomous driving apparatus 10 into the cleaning area 20.

Here, instead of using the coil the cleaning area detector 130 may be an weighing apparatus or the like that detects the autonomous driving apparatus 10 based on detection of the load of the autonomous driving apparatus 10.

In the first embodiment, the cleaning mat 21 uses a sheet-like member densely planted with fibers, specifically, a 2 m square rubber sheet of 5 mm thick over which 1 mm diameter fibers of 20 mm long are totally and densely planted.

In the cleaning process of the wheels 15 in the wheel cleaning system 1 of the autonomous driving apparatuses, the autonomous driving apparatus 10 is turned round at fixed position on the cleaning mat 21 in the center of cleaning area 20, by performing skid-steer operation, or turning left and right wheels 15 of the autonomous driving apparatus 10 in opposite directions relative to each other. By controlling the operation of the autonomous driving apparatus 10 in this way, whole circumferences of treads of the wheels 15 coming into contact with a road surface are rubbed against the fibers of the cleaning mat 21 so that dirt can be removed.

Next, the steps in the cleaning process of wheels 15 in the autonomous driving apparatus 10 by the wheel cleaning system 1 of the autonomous driving apparatuses of the first embodiment will be described along with the flow chart.

Figure 4:
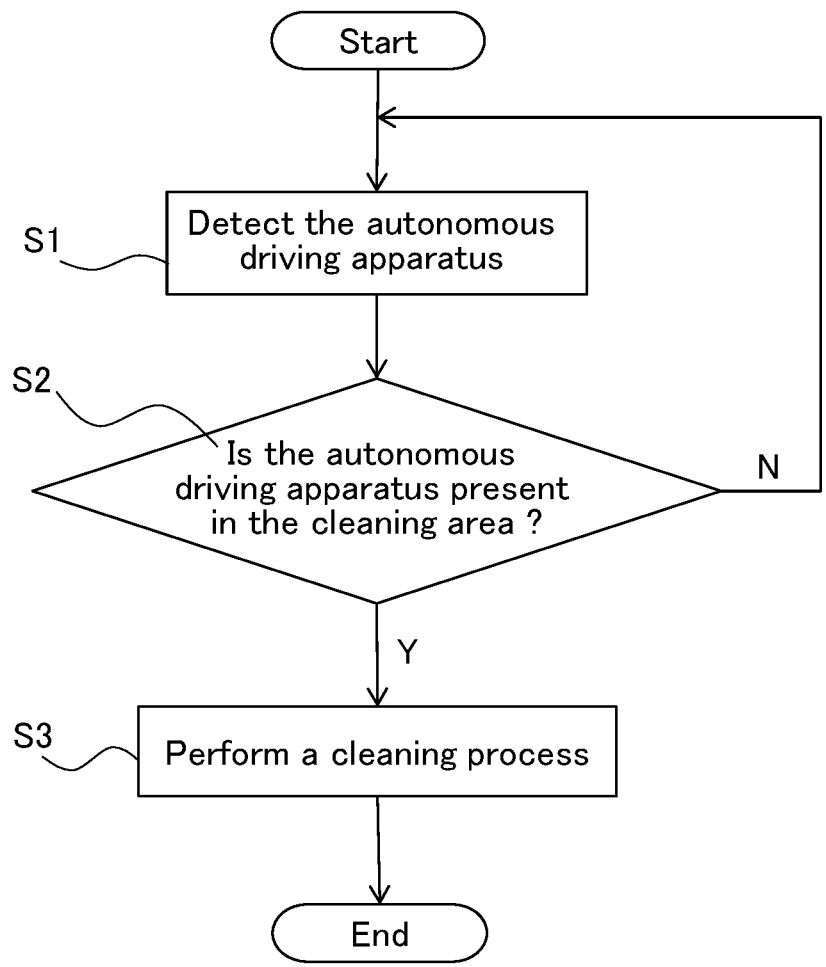
FIG. 4 is a flow chart for illustrating the steps for executing a clearing process of the wheels of the autonomous driving apparatus by the wheel cleaning system.

FIG. 4 is a flow chart for illustrating the steps for performing the clearing process of the wheels of the autonomous driving apparatus by the wheel cleaning system for autonomous driving apparatuses according to the first embodiment.

As shown in FIG. 4, as the cleaning process of the wheels 15 by the wheel cleaning system 1 for autonomous driving apparatuses is started, the cleaning area detector 130 (FIG. 1) starts detection of the autonomous driving apparatus 10 first (Step S1).

Then, it is determined whether or not the autonomous driving apparatus 10 is present in the cleaning area 20 (FIG. 1) by the area determinator 122 (FIG. 3) (Step S2). As the autonomous driving apparatus 10 (FIGS. 1 to 3) has been detected by the cleaning area detector 130, the area determinator 122 determines that the autonomous driving apparatus 10 is present in the cleaning area 20.

When it is determined at Step S2 that no autonomous driving apparatus 10 is present in the cleaning area 20, the operation returns to Step S1.

On the other hand, when it has been determined at Step S2 that the autonomous driving apparatus 10 is present in the cleaning area 20, the cleaning processor 121 switches the operation mode of the autonomous driving apparatus 10 from the drive mode to the cleaning mode for performing the cleaning process of wheels 15 to perform the cleaning process of wheels 15 (Step S3).

In the cleaning process of wheels 15, the autonomous driving apparatus 10 is turned round at a fixed position on the cleaning mat 21 around the center of the cleaning area 20 for a predetermined period of time so as to remove dirt from the whole circumferences of the treads of the wheels 15 coming into contact with the road surface.

In this way, it possible to readily remove dirt of wheels 15 of the autonomous driving apparatus 10.

According to the above-mentioned configuration in the first embodiment, the wheel cleaning system 1 for the autonomous driving apparatus 10 having wheels and capable of driving autonomously based on the peripheral information, has the cleaning area 20 where the wheels 15 of the autonomous driving apparatus 10 are cleaned. The cleaning area 20 has the cleaning area detector 130 and the cleaning mat 21. The control unit 120 controls the operation of the autonomous driving apparatus 10 so as to execute the cleaning process for wheels 15 in the cleaning area 20. As a result, the wheel cleaning system 1 can readily remove dirt from the wheels 15. Thus, it is possible to clean the wheels 15 by rubbing the wheels 15 against the cleaning mat 21 when, for example, the autonomous driving apparatus 10 with the wheels 15 soiled after travel in the outdoor area 30 enters the indoor area 40 from the outdoor area 30. Accordingly, it is possible for the autonomous driving apparatus 10 to clean the wheels with a simple arrangement without use of a dedicated cleaning device used for only cleaning tires disclosed in the Patent Documents 1 to 3 and enter the indoor area 40 without making itself dirty once again.

In the first embodiment, the wheel cleaning system 1 detects the presence of the autonomous driving apparatus 10 in the cleaning area 20 by the cleaning area determiner 130. However, in the present invention, the means for detecting the presence of the autonomous driving apparatus 10 in the cleaning area 20 is not limited to this. The other means for detecting is described in the second embodiment.

The Second Embodiment

Next, the second embodiment of the present invention will be described with reference to the drawings.

Figure 5:
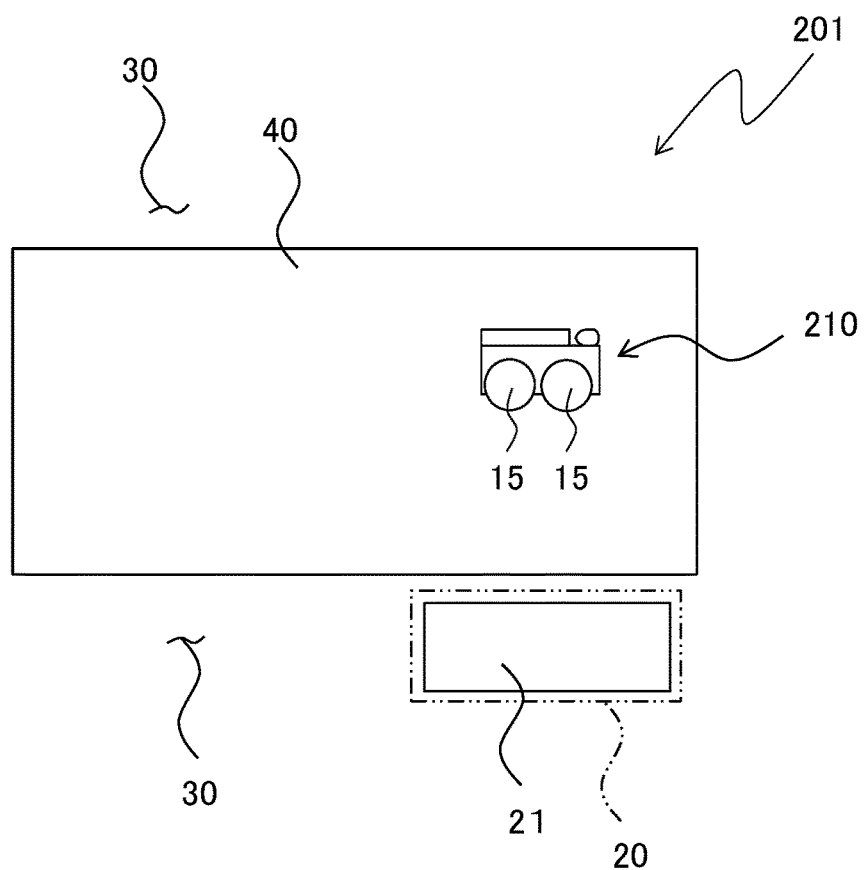
FIG. 5 is an illustrative diagram showing an overall configuration of a wheel cleaning system for autonomous driving apparatuses according to a second embodiment of the present invention.
Figure 6:
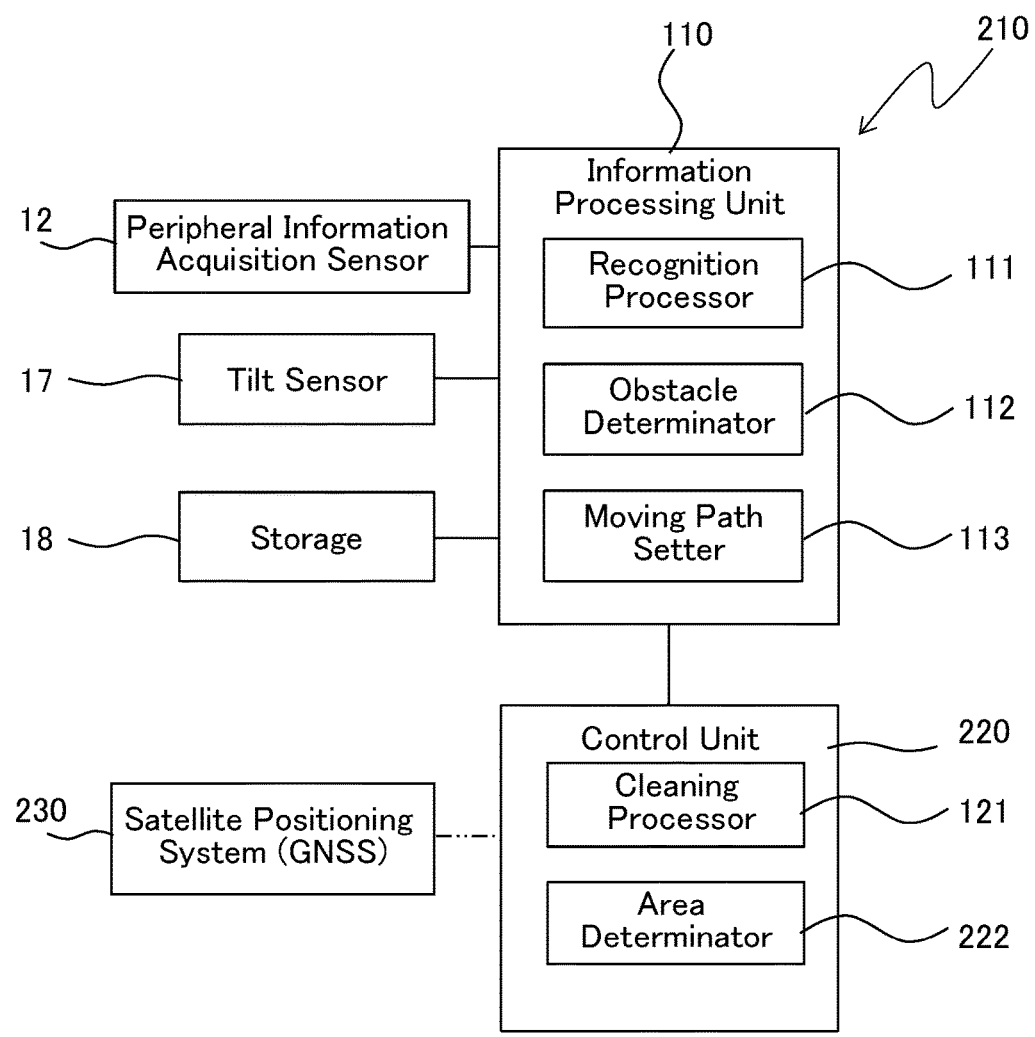
FIG. 6 is a block diagram showing an electric configuration of a control unit of the autonomous driving apparatus.

FIG. 5 is an illustrative diagram showing an overall configuration of a wheel cleaning system for the autonomous driving apparatus according to the second embodiment of the present invention. FIG. 6 is the block diagram showing the electric configuration of the control unit of the autonomous driving apparatus.

Here, as to the wheel cleaning system of the autonomous driving apparatuses in the second embodiment, the same components as those of the wheel cleaning system of the autonomous driving apparatuses of the first embodiment are allotted with the same reference numerals and description of them is omitted.

The wheel cleaning system 201 of the autonomous driving apparatus according to the second embodiment adopts, as shown in FIGS. 5 and 6, a satellite positioning system (GNSS: Global Navigation Satellite System) 230 as the position detecting device for detecting the positional information of the autonomous driving apparatus 210, instead of the cleaning area detector 130 for detecting the autonomous driving apparatus of the first embodiment.

The control unit 220 determines where the autonomous driving apparatus 210 is, based on the positional information of the autonomous driving apparatus 210 detected by the satellite positioning system 230.

The control unit 220 includes, in addition to the function of controlling the drive of the autonomous driving apparatus 210, a function of performing a cleaning process of the wheels 15 in the cleaning area 20.

In the second embodiment, the control unit 220 includes a cleaning processor 121 and an area determinator (position detector) 222.

The area determinator (position detector) 222, based on the detected result of the positional information by the satellite positioning system 230, determines which area among the outdoor area 30, indoor area 40 and cleaning area 20, the autonomous driving apparatus 210 resides.

The cleaning area 20 is a place provided between the outdoor area 30 and the indoor area 40 as shown in FIG. 5 and is equipped with the cleaning mat (rubbing member) 21.

Next, the steps of the cleaning process of wheels 15 of the autonomous driving apparatus 210 by the wheel cleaning system 201 of the autonomous driving apparatus of the second embodiment will be described with a flow chart.

Figure 7:
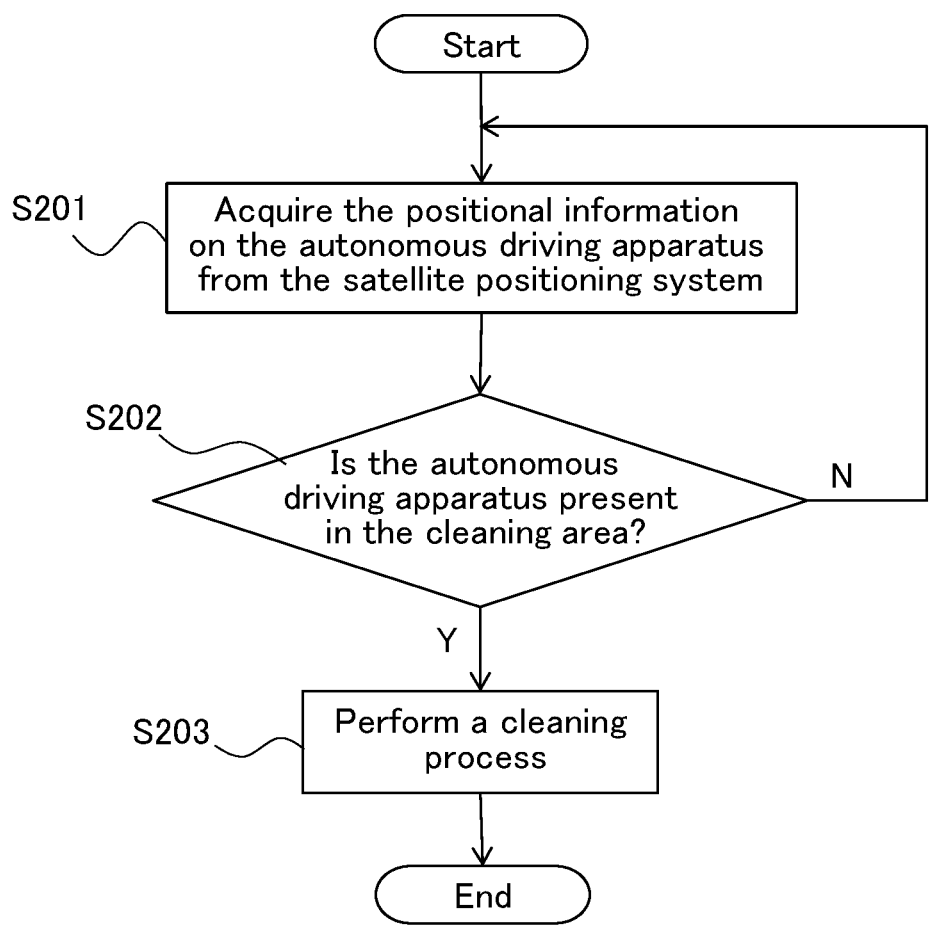
FIG. 7 is a flow chart for illustrating the steps for executing a clearing process of the wheels of the autonomous driving apparatus by the wheel cleaning system.

FIG. 7 is a flow chart for illustrating the steps for performing a clearing process of the wheels of the autonomous driving apparatus by the wheel cleaning system for autonomous driving apparatuses according to the second embodiment.

As shown in FIG. 7, as the cleaning process of the wheels 15 by the wheel cleaning system 201 for autonomous driving apparatuses is started, the positional information on the autonomous driving apparatus 210 is acquired first by the satellite positioning system 230 (Step S201).

Then, it is determined whether or not the autonomous driving apparatus 210 is present in the cleaning area 20 by the area determinator 222 (Step S202).

When it is determined at Step S202 that no autonomous driving apparatus 210 is present in the cleaning area 20, the operation returns to Step S201.

On the other hand, when it has been determined at Step S202 that the autonomous driving apparatus 210 is present in the cleaning area 20, the cleaning processor 121 switches the operation mode of the autonomous driving apparatus 210 from the drive mode to the cleaning mode for performing the cleaning process of wheels 15 to perform the cleaning process of wheels 15 (Step S203).

In the cleaning process of wheels 15, the autonomous driving apparatus 210 is turned round at a fixed position on the cleaning mat 21 around the center of the cleaning area 20 for a predetermined period of time so as to remove dirt from the whole circumferences of the wheels 15 coming into contact with the road surface.

In this way, it is possible to readily remove dirt of wheels 15 of the autonomous driving apparatus 210.

According to the above-mentioned configuration of the second embodiment, the wheel cleaning system 201 for the autonomous driving apparatus 210 having wheels 15 and capable of driving autonomously based on peripheral information, includes the cleaning area 20 where the wheels 15 of the autonomous driving apparatus 210 are cleaned. The cleaning area 20 is equipped with the cleaning mat 21 for cleaning the wheels 15 by rotating the wheels and rubbing the wheels against the mat. The control unit 220 controls the operation of the autonomous driving apparatus 210 so as to perform the cleaning process for cleaning wheels 15 in the cleaning area 20. As a result, the wheel cleaning system 201 can readily remove dirt from the wheels 15. With this configuration, it is possible to clean dirt by making the wheels 15 rub against the cleaning map 21 when, for example, the autonomous driving apparatus 210 with the wheels 15 soiled after travel in the outdoor area 30 enters the indoor area 40 from the outdoor area 30. Accordingly, it is possible for the autonomous driving apparatus 210 to clean the wheels with a simple arrangement without use of any other cleaning device (device dedicated for cleaning) used for only cleaning of tires as shown in Patent Documents 1 to 3, and enter the indoor area 40 without making itself dirty once again.

Meanwhile, the satellite positioning system 230 may be provided in the control unit 220.

The Third Embodiment

Next, the third embodiment of the present invention will be described with reference to the drawings.

Figure 8:
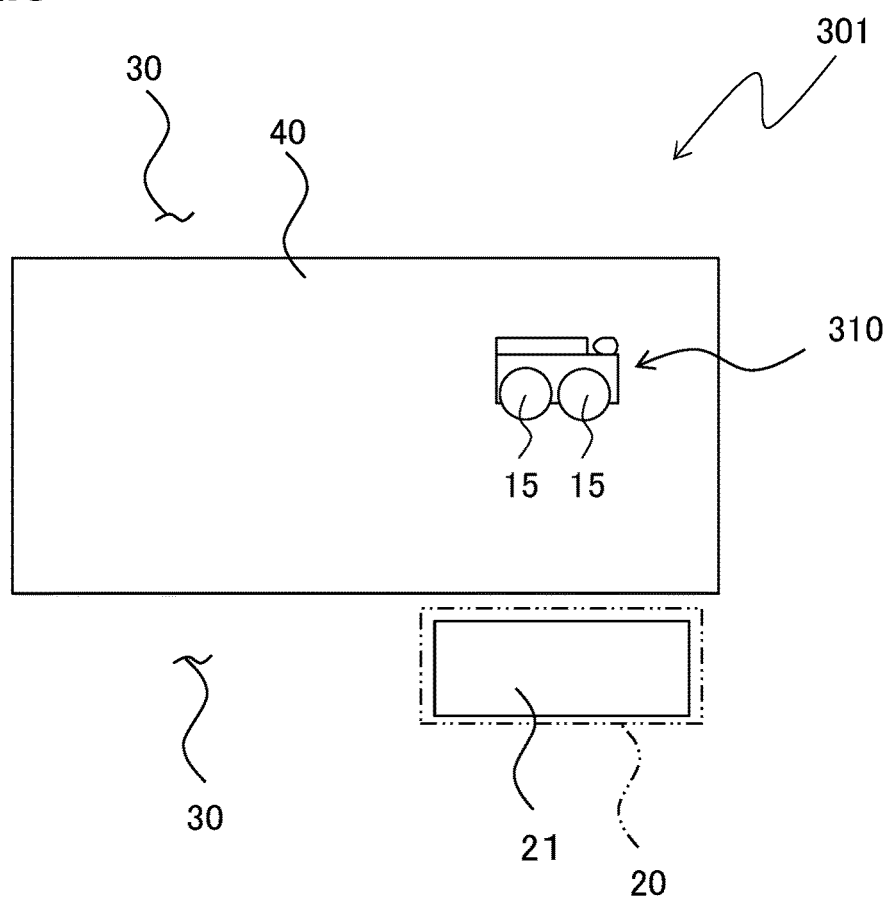
FIG. 8 is an illustrative diagram showing an overall configuration of the wheel cleaning system for autonomous driving apparatuses according to a third embodiment of the present invention.
Figure 9:
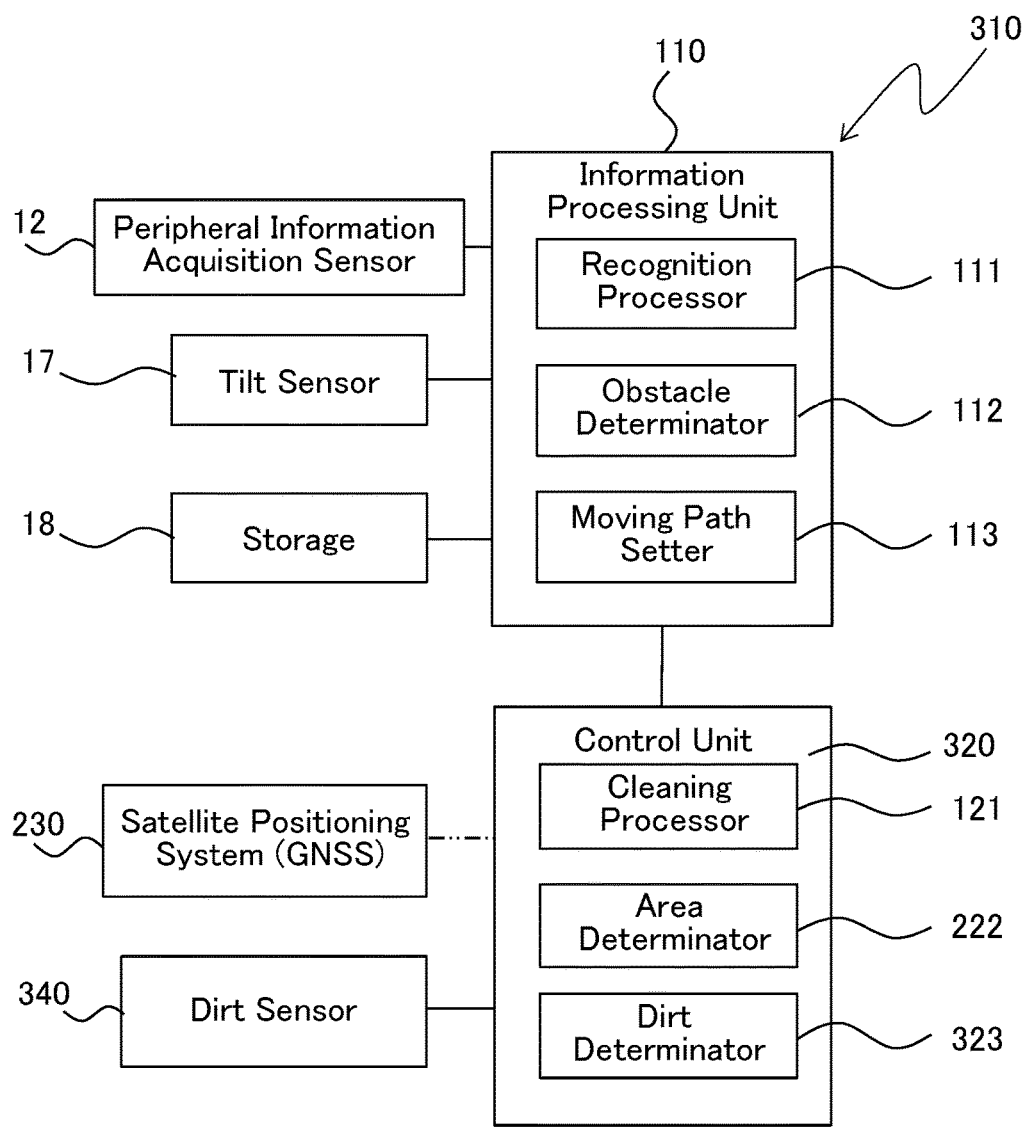
FIG. 9 is a block diagram showing an electric configuration of a control unit of the autonomous driving apparatus.

FIG. 8 is an illustrative diagram showing the overall configuration of the wheel cleaning system for the autonomous driving apparatus according to the third embodiment of the present invention. FIG. 9 is a block diagram showing the electric configuration of the control unit of the autonomous driving apparatus.

Here, in the wheel cleaning system of the autonomous driving apparatuses in the third embodiment, description of the same components as those in the wheel cleaning system of the autonomous driving apparatus of the second embodiment is omitted by allotting them with the same reference numerals.

As shown in FIGS. 8 and 9, the wheel cleaning system 301 of the autonomous driving apparatuses according to the third embodiment includes a dirt sensor 340 in addition to the configuration of the wheel cleaning system 201 of the autonomous driving apparatuses of the second embodiment. The wheel cleaning system 301 detects dirt of the wheels 15 to perform the cleaning process of the wheels 15. Considered from a different angle, the autonomous driving apparatus can perform the cleaning process when there is a change of a driving environment such as the autonomous driving apparatus moves from an outer road surface which is easy to become dirty of the wheels to an inner road surface which is hard to become dirty of the wheels, when the outer road surface includes a road surface which is easy to become dirty of the wheels such as a grassy place, meadow, grassland. The outer road surface which is easy to become dirty of the wheels, may be a grassy place, meadow, grassland or the like. The inner road surface which is hard to become dirty of the wheels, may be asphalt, concrete, wood, cork, rubber, metal plastic or the like.

Road information of the outer road surface and the inner road surface may be set in the storage 18. The road information in the storage 18 can be changed by the user in accordance with a using condition of the autonomous driving apparatus.

The dirt sensor 340 is a sensor that provides image information/image signals to be able to detect the dirt state of the wheels 15 by using a CCD (Charge-Coupled Device) camera and others. The dirt sensor 340 is arranged in the cleaning area 20 and detects the dirt state of the treads of the wheels 15 of the autonomous driving apparatus 310, which come in contact with the road surface.

Here, the dirt sensor 340 may be built in the autonomous driving apparatus 310, and may be adapted to detect the dirt state of the wheels, constantly or on demand.

The control unit 320 performs the cleaning process of the wheels 15 in the cleaning area 20 before the autonomous driving apparatus 310 enters the indoor area 40 from the outdoor area 30.

In the third embodiment, the control unit 320 includes a cleaning processor 121, an area determinator 222 and a dirt determinator 323, and has a function of performing the cleaning process of the wheels 15 in addition to a function of controlling the drive of the autonomous driving apparatus 310.

The dirt determinator 323 determines whether or not the treads of the wheels 15 coming into contact with the road surface (FIG. 8) are dirty, based on the image information/image signals (the detected result) supplied from the dirt sensor 340. Determining method of whether or not the wheels 15 are dirty, can be used a method that, for example, first detects a ratio (detection ratio) of the dirt area for all area of the tread of the wheel 15, and determines that it is not dirt when the detection ratio is equal to or lower than a regulated value (threshold) and that it is dirt when the detection ratio is greater than the regulated value (threshold). Meanwhile, the detection ratio may be used a ratio of the dirt area for a unit area of the tread of the wheel 15, instead of the ration of the dirt area for all area of the tread of the wheel 15. Also, determining method is not limited to the above-method.

Next, steps of the cleaning process of wheels 15 of the autonomous driving apparatus 310 by the wheel cleaning system 301 of the autonomous driving apparatuses of the third embodiment will be described with a flow chart.

Figure 10:
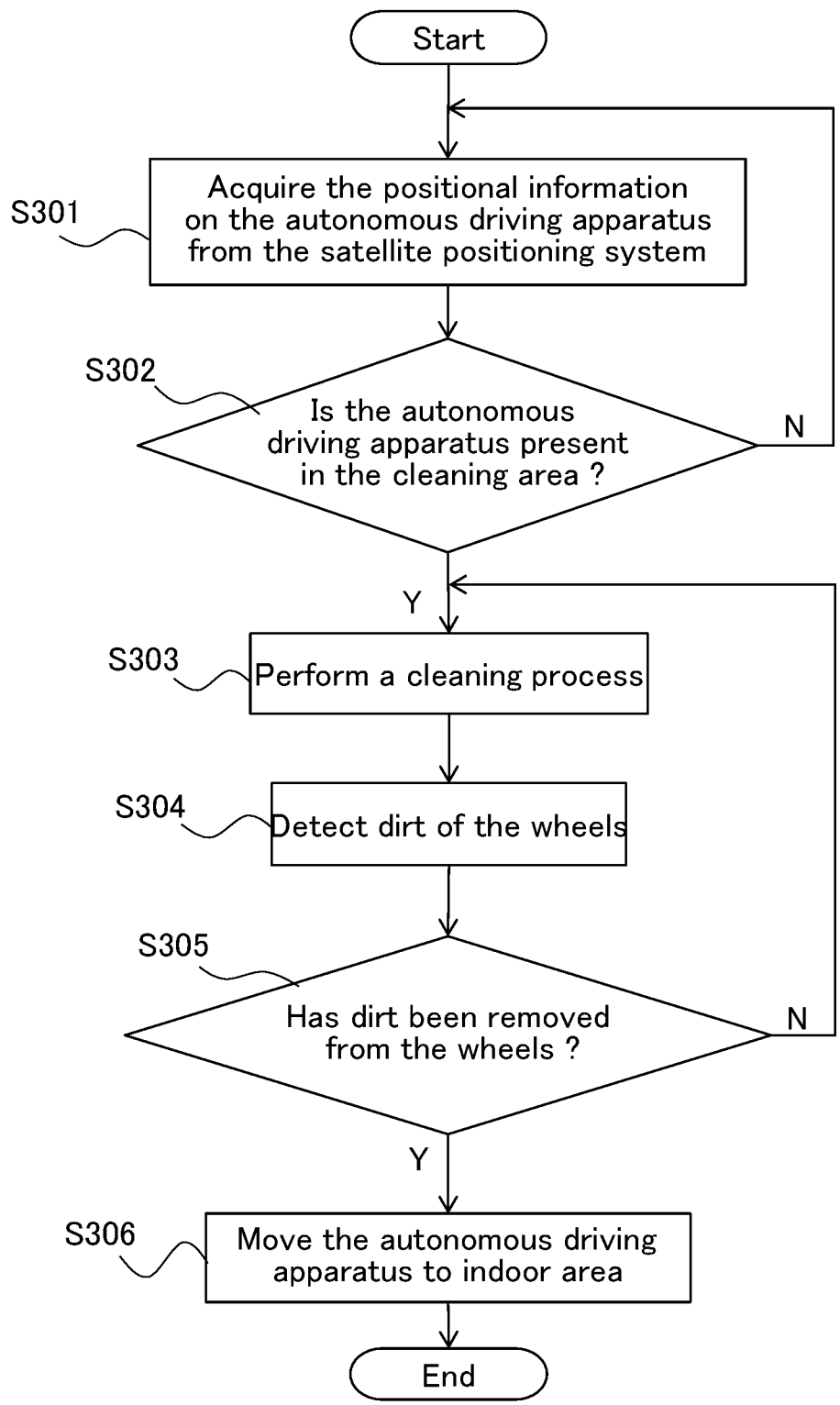
FIG. 10 is a flow chart for illustrating the steps for executing a clearing process of the wheels of an autonomous driving apparatus by the wheel cleaning system.

FIG. 10 is a flow chart for illustrating the steps for performing the clearing process of the wheels of the autonomous driving apparatus by the wheel cleaning system for autonomous driving apparatuses according to the third embodiment.

As shown in FIG. 10, as the cleaning process of the wheels 15 by the wheel cleaning system 301 for autonomous driving apparatuses is started, positional information on the autonomous driving apparatus 310 is acquired first by the satellite positioning system 230 (Step S301).

Then, it is determined whether or not the autonomous driving apparatus 310 is present in the cleaning area 20 by the area determinator (position detector) 222 (Step S302).

When it is determined at Step S302 that no autonomous driving apparatus 310 is present in the cleaning area 20, the operation returns to Step S301.

On the other hand, when it has been determined at Step S302 that the autonomous driving apparatus 310 is present in the cleaning area 20, the cleaning processor 121 switches the operation mode of the autonomous driving apparatus 310 from the drive mode to the cleaning mode for performing the cleaning process of wheels 15 to perform the cleaning process of wheels 15 (Step S303).

In the cleaning process of wheels 15, the autonomous driving apparatus 310 is turned round at a fixed position on the cleaning mat 21 around the center of the cleaning area 20 for a predetermined period of time so as to remove dirt from the wheels 15.

Then, the dirt sensor 340 detects the dirt state of the wheels after the cleaning process (Step S304), and the dirt determinator 323 determines whether or not dirt has been removed from the wheels 15 (Step S305).

When it is determined at Step S305 that dirt of the wheels 15 has not yet been removed (there is dirt of the wheels 15), the operation goes to Step S303 and the cleaning process is performed once again.

On the other hand, when it is determined at Step S305 that dirt of the wheels 15 has been removed (there is no dirt of the wheels 15), the autonomous driving apparatus 310 is moved to the indoor area 40 (Step S306).

In this way, it possible to readily remove dirt of wheels 15 of the autonomous driving apparatus 310. Thus, the autonomous driving apparatus 310 can be made to enter the indoor area 40 with dirt removed from the wheels.

According to the above-mentioned configuration of the third embodiment, the wheel cleaning system 301 for the autonomous driving apparatus 310 having wheels 15 and capable of driving autonomously based on the peripheral information, has the cleaning area 20 where the wheels 15 of the autonomous driving apparatus 310 are cleaned. The cleaning area 20 is equipped with the cleaning mat 21 for cleaning the wheels 15 by rotating the wheels and rubbing the wheels 15 against the mat. The control unit 320 controls the operation of the autonomous driving apparatus 310 so as to perform the cleaning process for cleaning wheels 15 in the cleaning area 20. As a result, the wheel cleaning system 301 can readily remove dirt from the wheels 15. With this configuration, it is possible to clean dirt by making the wheels 15 rub against the cleaning mat 21 when, for example, the autonomous driving apparatus 310 with the wheels 15 soiled after travel in the outdoor area 30 enters the indoor area 40 from the outdoor area 30. Accordingly, it is possible for the autonomous driving apparatus 310 to clean the wheels with a simple arrangement without use of dedicated cleaning device and the like and enter the indoor area 40 without making itself dirty once again.

Though, at the stage of the cleaning process by the control unit 320 in the third embodiment, the dirt condition of the wheels 15 is detected once again at the end of the cleaning process of the wheels 15 to confirm the state of the cleaning process, if the wheels 15 is not clean enough, it is possible to move the autonomous driving apparatus 310 over the cleaning mat 21 to the area where the surface of the cleaning mat 21 is less dirty and perform the cleaning process on that area.

Further, as to the confirmation of the effect of the cleaning process, it is possible to check the effect of cleaning by use of image recognition, i.e., by calculating a differential image between the image state of the cleaning mat 21 before the autonomous driving apparatus 310 enters the indoor area 40 and the image state of the cleaning mat 21 after the cleaning process of the wheels 15.

Though, in the third embodiment, the dirt sensor 340 is used to detect dirt of the wheels 15 in preforming the cleaning process, it is also possible to use a camera that is capable of detecting the change of the dirt condition of the wheels 15 and continue the cleaning process until the dirt condition of the wheels 15 lowers a regulated value (threshold).

Further, if the user wants to better the finished cleaning condition of the wheels 15, it is possible to provide the autonomous driving apparatus 310 with a learning function such that the autonomous driving apparatus itself can set the processing time of cleaning longer from the next time and change the regulated value (threshold) for the dirt state, and so on.

Also, the satellite positioning system 230 may be provided in the control unit 320.

The Fourth Embodiment

Next, the fourth embodiment of the present invention will be described with reference to the drawings.

Figure 11:
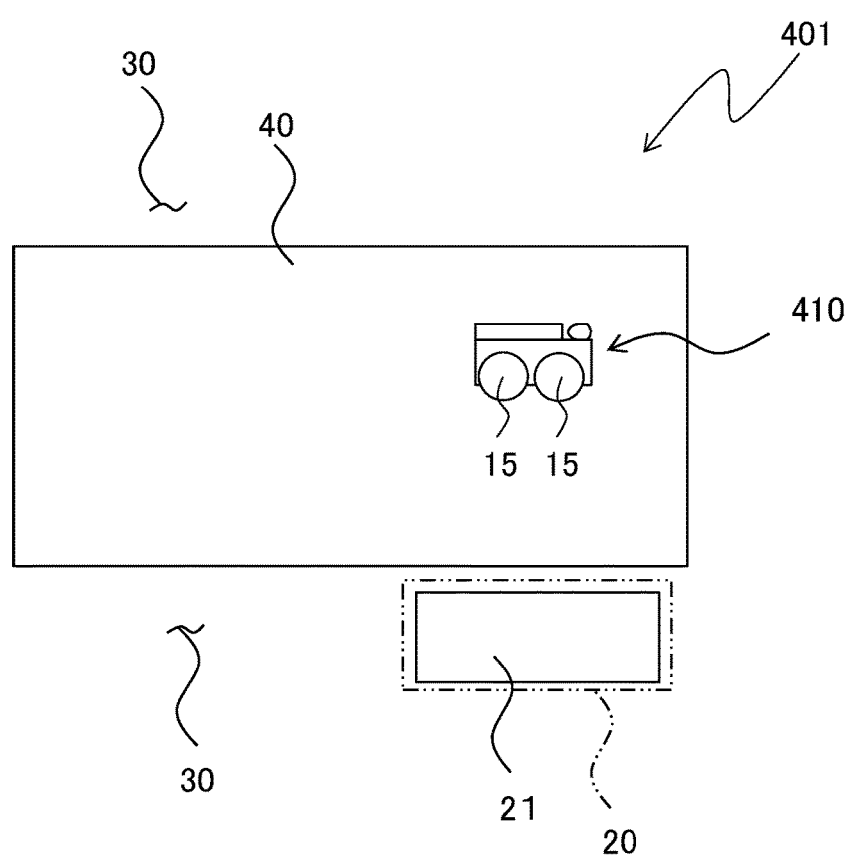
FIG. 11 is an illustrative diagram showing an overall configuration of a wheel cleaning system for autonomous driving apparatuses according to a fourth embodiment of the present invention.
Figure 12:
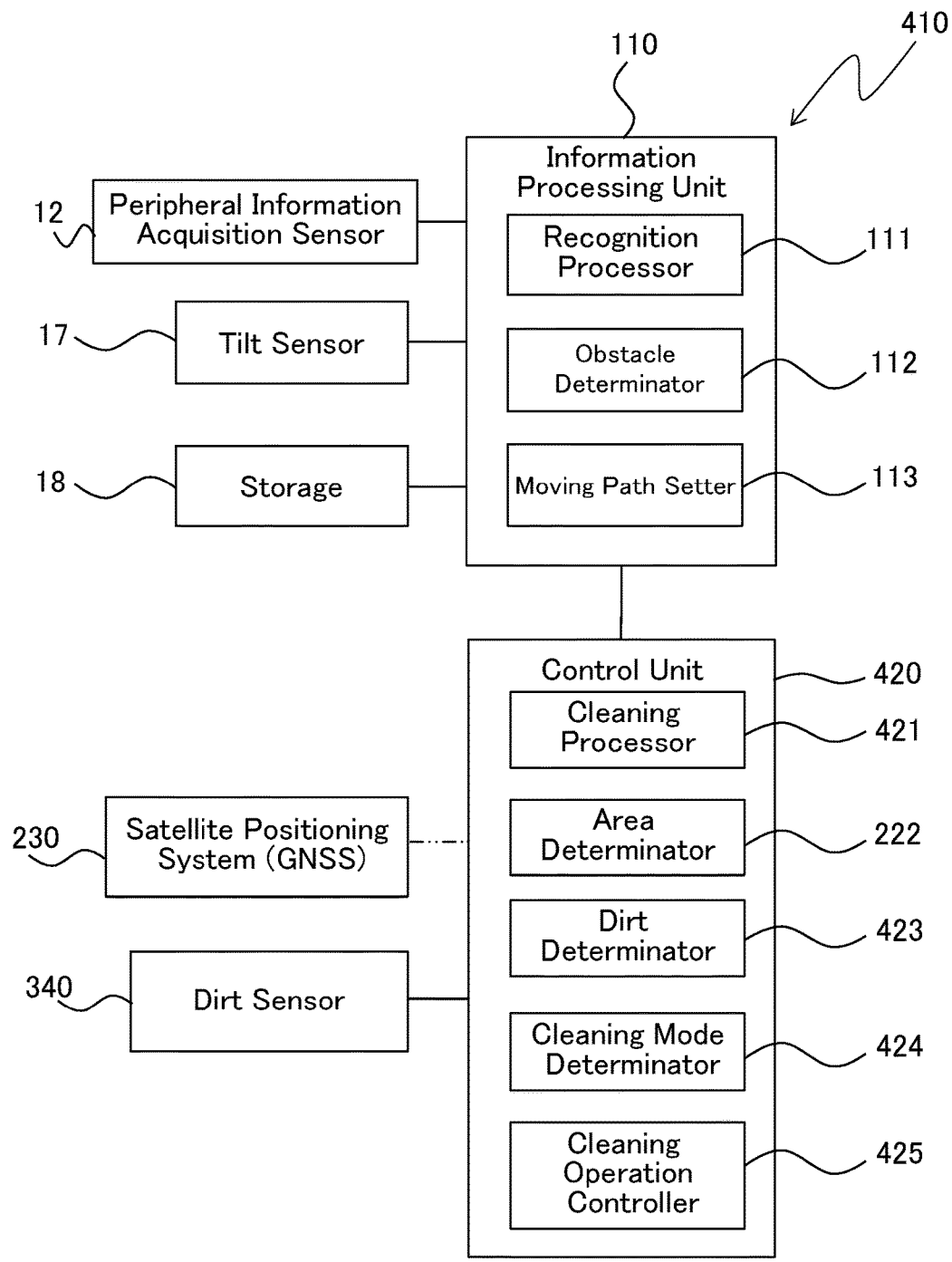
FIG. 12 is a block diagram showing an electric configuration of a control unit of the autonomous driving apparatus.

FIG. 11 is an illustrative diagram showing an overall configuration of a wheel cleaning system for an autonomous driving apparatus according to the fourth embodiment of the present invention. FIG. 12 is the block diagram showing the electric configuration of the control unit of the autonomous driving apparatus.

Here, in the wheel cleaning system of the autonomous driving apparatus in the fourth embodiment, description of the same components as those in the wheel cleaning system 301 of the autonomous driving apparatus 310 of the third embodiment is omitted by allotting them with the same reference numerals.

As shown in FIG. 12, the wheel cleaning system 401 of the autonomous driving apparatus according to the fourth embodiment includes a cleaning mode determinator 424 and a cleaning operation controller 425 in the control unit, in addition to the configuration of the wheel cleaning system 301 of the autonomous driving apparatus of the third embodiment. The wheel cleaning system 401 performs a cleaning process of the wheels 15 in accordance with the dirt state of the wheel 15. Considered from a different angle, the autonomous driving apparatus 510 can perform the cleaning process of the wheels 15 when there is a change of the driving environment of the autonomous driving apparatus 510 such as the autonomous driving apparatus moves from an environment in which it is raining or snowing to an environment in which it is not raining or snowing. In this situation, the outer road surface is not only limited to the road surface which is easy to become dirty of the wheels, but also it is suitable for the road surface which is hard to become dirty of the wheels.

The dirt sensor 340 is a sensor that can detect the dirt state of the wheels 15 by using CCD camera and the like. The dirt sensor 340 is disposed in the cleaning area 20 and detects the dirt state of the wheels 15 of the autonomous driving apparatus 410.

The control unit 420 controls the operation of the autonomous driving apparatus 410 so as to perform the cleaning process in the cleaning area 20 before the autonomous driving apparatus 410 enters the indoor area 40 from the outdoor area 30.

In the fourth embodiment, the control unit 420 includes a cleaning processor 421, an area determinator 222, a dirt determinator 423, a cleaning mode determinator 424 and a cleaning operation controller 425 and has a function of performing a cleaning process of the wheels 15 in addition to a function of controlling the drive of the autonomous driving apparatus 410.

The cleaning processor 421 controls the autonomous driving apparatus 410 so that the autonomous driving apparatus 410 will perform a cleaning process in the cleaning area 20. The cleaning processor 421 has a cleaning mode for performing the cleaning process and changes operation mode from the drive mode to the cleaning mode when the autonomous driving apparatus 410 enters the cleaning area 20.

As the cleaning process, a plurality of cleaning modes are set in accordance with the dirt condition of the wheels 15.

Foe examples, the cleaning mode may include a mode in which the apparatus is turned round at a fixed position in a fixed direction by skid-steering method, a mode in which the apparatus is turned round at a fixed position by switching its rotational direction, a mode in which the apparatus is turned round at a fixed position intermittently, a mode in which the turning speed of the turn at the fixed position in the above-mentioned modes is varied, and others.

Further, the cleaning mode may be configured to be able to vary the cleaning period of time such as a short-time cleaning mode, a long-time cleaning mode and the like, in accordance with the dirt condition of the wheels 15.

The dirt determinator 423 determines the dirt state of the wheels 15, based on the detected result of the dirt sensor 340.

The cleaning mode determinator 424 determines a cleaning mode for performing the cleaning process of the wheels 15, based on the determined result of the dirt determinator 423.

The cleaning operation controller 425 controls the operation of the autonomous driving apparatus 410 so as to perform the cleaning process in the cleaning processor 421 in accordance with the dirt state of wheels 15, based on the determined result in the cleaning mode determinator 424.

Next, the steps of the cleaning process of wheels 15 of the autonomous driving apparatus 410 by the wheel cleaning system 401 of the autonomous driving apparatus of the fourth embodiment will be described with a flow chart.

Figure 13:
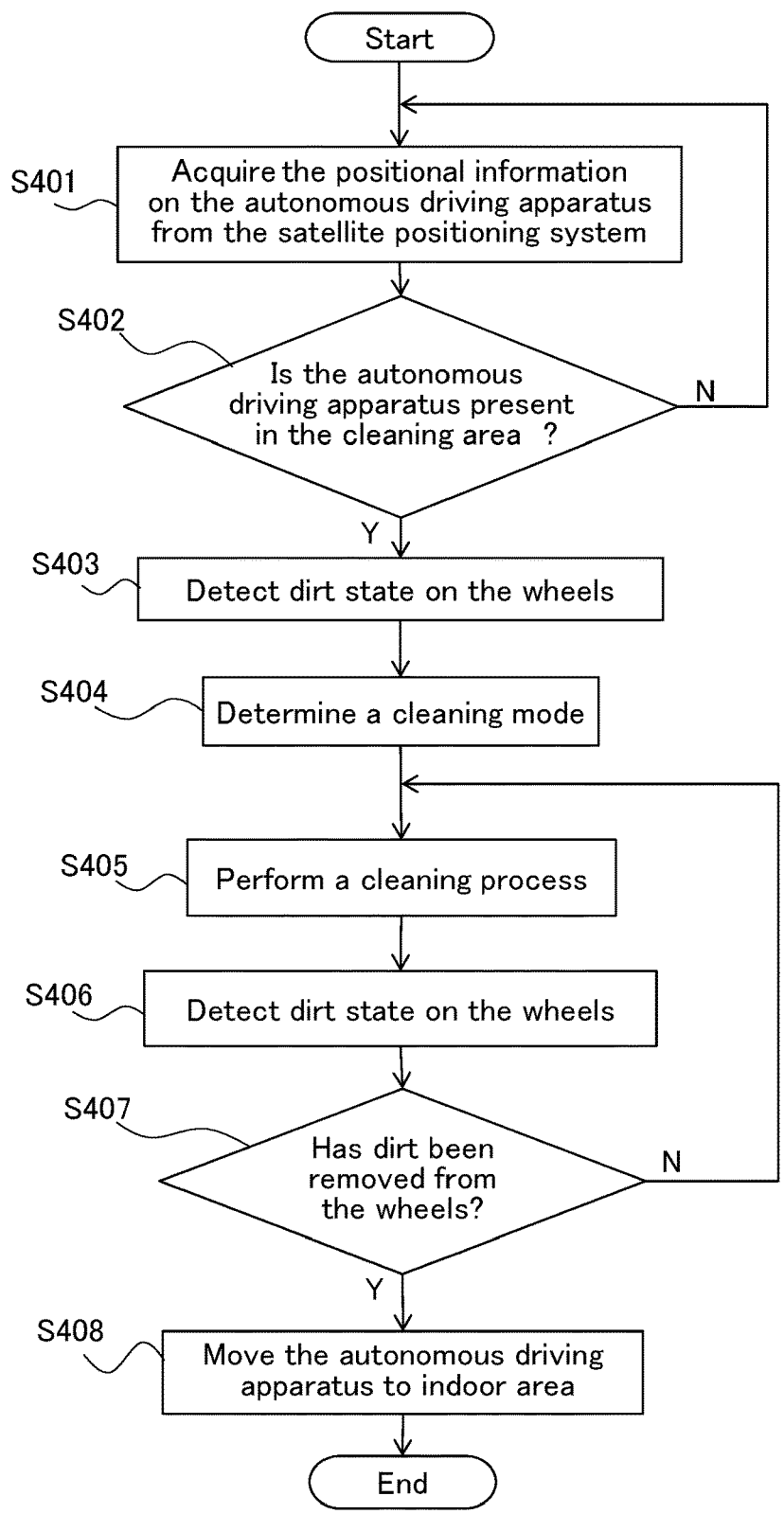
FIG. 13 is a flow chart for illustrating the steps for executing a clearing process of the wheels of an autonomous driving apparatus by the wheel cleaning system.

FIG. 13 is a flow chart for illustrating the steps for performing the clearing process of the wheels of the autonomous driving apparatus by the wheel cleaning system for autonomous driving apparatuses according to the fourth embodiment.

As shown in FIG. 13, as the cleaning process of the wheels 15 by the wheel cleaning system 401 for autonomous driving apparatuses is started, the positional information on the autonomous driving apparatuses 410 are acquired first by the satellite positioning system 230 (Step S401).

Then, it is determined whether or not the autonomous driving apparatus 410 is present in the cleaning area 20 by the area determinator (position detector) 222 (Step S402).

When it is determined at Step S402 that no autonomous driving apparatus 410 is present in the cleaning area 20, the operation returns to Step S401.

On the other hand, when it has been determined at Step S402 that the autonomous driving apparatus 410 is present in the cleaning area 20, the dirt sensor 340 detects dirt of the wheels 15 (Step S403).

Then, based on the detected result by the dirt sensor 340, the dirt determinator 423 determines the dirt condition of the wheels 15, and the cleaning mode determinator 424 (FIG. 12) determines a cleaning mode in accordance with the dirt condition of the wheels 15 (Step S404). Then, the cleaning operation controller 425 (FIG. 12) performs the cleaning process of the wheels 15 in the determined cleaning mode (Step S405).

In the cleaning process of wheels 15 the autonomous driving apparatus 410 is placed on the cleaning mat 21 around the center of the cleaning area 20 so that dirt of the wheels 15 is removed by performing the cleaning process in the designated cleaning mode.

Then, the dirt sensor 340 detects the dirt condition of the wheels 15 (Step S406) after the cleaning process, and the dirt determinator 423 determines whether or not dirt has been removed from the wheels 15 (Step S407).

When it is determined at Step S407 that dirt of the wheels 15 has not yet been removed, the operation goes to Step S405 and the cleaning process is performed once again.

On the other hand, when it is determined at Step S407 that dirt of the wheels 15 has been removed, the autonomous driving apparatus 410 is moved to the indoor area 40 (Step S408).

In this way, it possible to readily remove dirt by performing the cleaning process in the optimal cleaning mode in accordance with the dirt state of wheels 15 of the autonomous driving apparatus 410. Thus, the autonomous driving apparatus 410 can be made to enter the indoor area 40 with the cleaned wheels removed the dirt.

According to the configuration of the fourth embodiment, the wheel cleaning system 401 of the autonomous driving apparatus 410 having the wheels 15 and capable of driving autonomously based on peripheral information has a cleaning area 20 for cleaning the wheels 15 of the autonomous driving apparatus 410. The cleaning area 20 is equipped with the cleaning mat 21 for cleaning the wheels 15 by rotating the wheels and rubbing the wheels against the mat. The control unit 420 controls the operation of the autonomous driving apparatus 410 so as to perform the cleaning process based on the optimal cleaning mode according to the dirt state of the wheels 15 in the cleaning area 20. As a result, the wheel cleaning system 401 can readily remove dirt from the wheels 15. With this configuration, it is possible to clean dirt by making the wheels 15 rub against the cleaning map 21 when, for example, the autonomous driving apparatus 410 with the wheels 15 soiled after travel in the outdoor area 30 enters the indoor area 40 from the outdoor area 30. Accordingly, it is possible for the autonomous driving apparatus 410 to clean the wheels with a simple arrangement without use of any other dedicated cleaning device, and enter the indoor area 40 without making itself dirty once again.

Meanwhile, the satellite positioning system 230 may be provided in the control unit 420.

The Fifth Embodiment

Next, the fifth embodiment of the present invention will be described with reference to the drawings.

Figure 14:
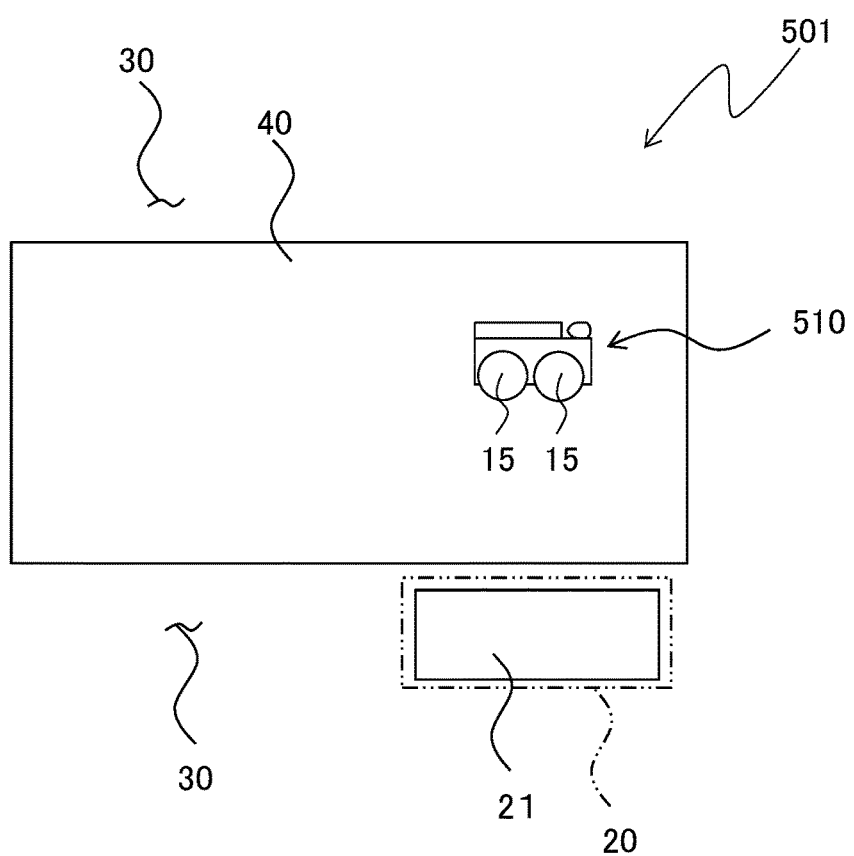
FIG. 14 is an illustrative diagram showing an overall configuration of a wheel cleaning system for autonomous driving apparatuses according to a fifth embodiment of the present invention.
Figure 15:
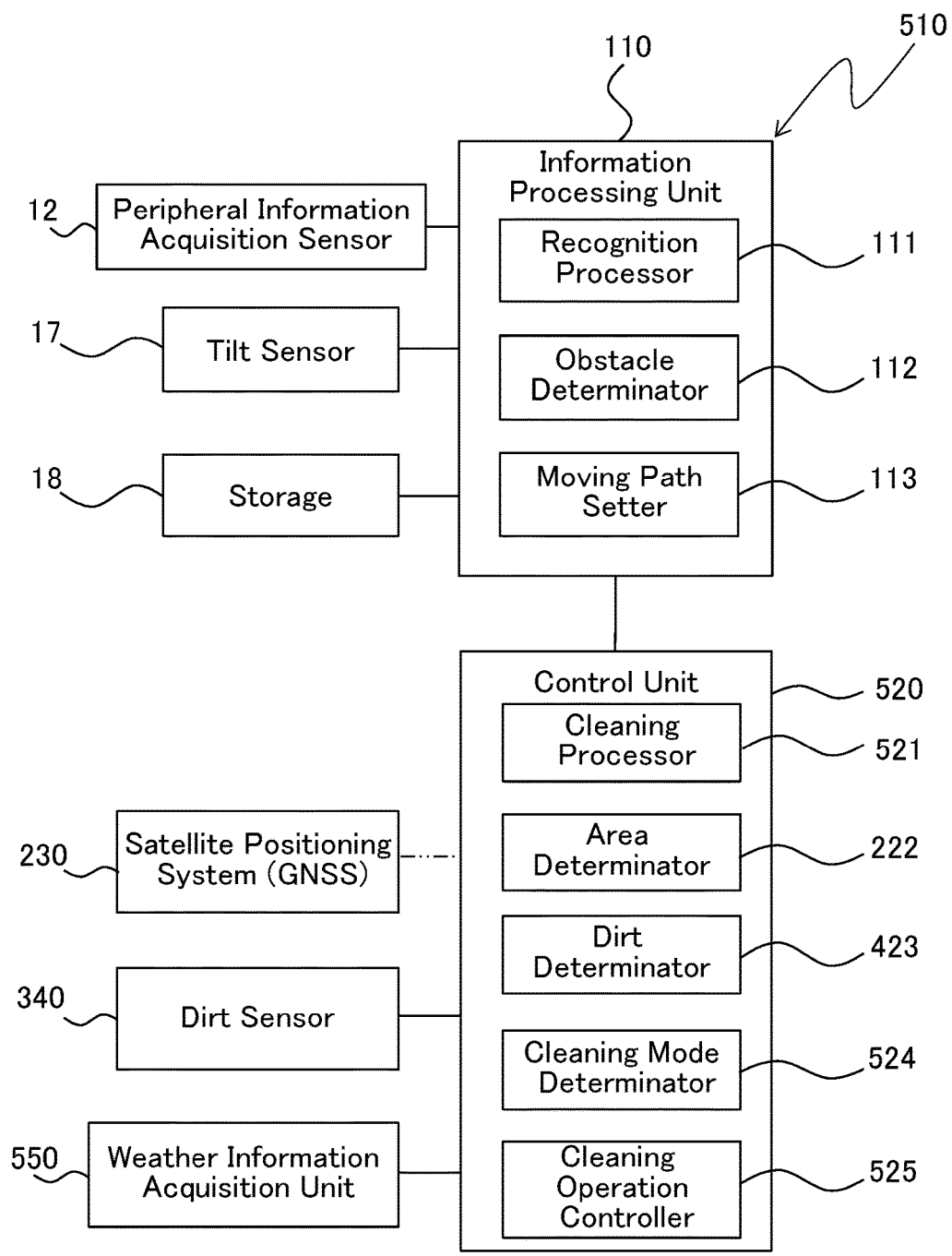
FIG. 15 is a block diagram showing an electric configuration of a control unit of the autonomous driving apparatus.

FIG. 14 is an illustrative diagram showing an overall configuration of a wheel cleaning system for the autonomous driving apparatus according to the fifth embodiment. FIG. 15 is the block diagram showing the electric configuration of a control unit of the autonomous driving apparatus 510.

Here, in the wheel cleaning system of the autonomous driving apparatus in the fifth embodiment, description of the same components as those in the wheel cleaning system of the autonomous driving apparatus of the fourth embodiment is omitted by allotting them with the same reference numerals.

As shown in FIG. 15, the wheel cleaning system 501 of the autonomous driving apparatus according to the fifth embodiment includes a weather information acquisition unit 550 in addition to the configuration of the wheel cleaning system. 401 of the autonomous driving apparatus of the fourth embodiment. The wheel cleaning system 501 acquires weather information on the region (field) where the autonomous driving apparatus 510 is driven, from the outside through the weather information acquisition unit 550 to perform a cleaning process of the wheels 15 in accordance with the dirt state of the wheels 15 depending on the weather. Considered from a different angle, the autonomous driving apparatus 510 can perform the cleaning process of the wheels 15 when there is a change of the driving environment of the autonomous driving apparatus 510 such as the autonomous driving apparatus moves from an environment in which it is raining or snowing to an environment in which it is not raining or snowing. In this situation, the outer road surface is not only limited to the road surface which is easy to become dirty of the wheels, but also it is suitable for the road surface which is hard to become dirty of the wheels.

The control unit 520 controls the operation of the autonomous driving apparatus 510 so as to perform a cleaning process in the cleaning area 20 before the autonomous driving apparatus 510 enters the indoor area 40 from the outdoor area 30.

The control unit 520 in the fifth embodiment includes a cleaning processor 521, an area determinator 222, a dirt determinator 423, a cleaning mode determinator 524 and a cleaning operation controller 525, and has a function of performing the cleaning process of the wheels 15 (cleaning mode), in addition to a function of controlling the drive of the autonomous driving apparatus 510 (drive mode).

The cleaning processor 521 controls the operation of the autonomous driving apparatus 510 so that the autonomous driving apparatus 510 will perform the cleaning process in the cleaning area 20. The cleaning processor 521 has the cleaning mode for performing the cleaning process and changes operation mode from the drive mode to the cleaning mode when the autonomous driving apparatus 510 enters the cleaning area 20.

Regarding the cleaning mode, a plurality of cleaning modes is set in accordance with the weather condition (sunny, cloudy, rainy, snowy, etc.) and the dirt state of the wheels 15. Examples of the cleaning mode may include a mode in which the apparatus is turned round at a fixed position in a fixed direction by skid-steering method, a mode in which the apparatus is turned round at a fixed position by switching its rotational direction, a mode in which the apparatus is turned round at a fixed position intermittently, a mode in which the turning speed of the turn at the fixed position in the above-mentioned modes is varied, and others.

Further, the cleaning mode may be switched in accordance with the weather condition.

For example, since it is expected that the wheels 15 are likely to be soiled (with mud) if it rains, the long-time cleaning mode for a long time cleaning process may be set, whereas the short-time cleaning mode for a short time cleaning process can be set if it is fine because it is expected that the wheels 15 are unlikely to be soiled or likely to be soiled with dry dirt.

When the value of dirt detection of the wheels 15 (FIG. 14) determined by the dirt determinator 423 is greater than a predetermined value (the first threshold), the cleaning mode selector 524 determines a cleaning mode for performing the cleaning process of the wheels 15 based on the weather information acquired by the weather information acquisition unit 550 and the determined result of the dirt determinator 423.

The cleaning operation controller 525 controls the operation of the autonomous driving apparatus 510 so as to perform the cleaning process by the cleaning processor 521 in accordance with the dirt state on the wheels 15 based on the determined result of the cleaning mode determinator 524.

Next, the steps of the cleaning process of wheels 15 of the autonomous driving apparatus 510 by the wheel cleaning system 501 (FIG. 14) of the autonomous driving apparatuses of the fifth embodiment will be described with a flow chart.

Figure 16:
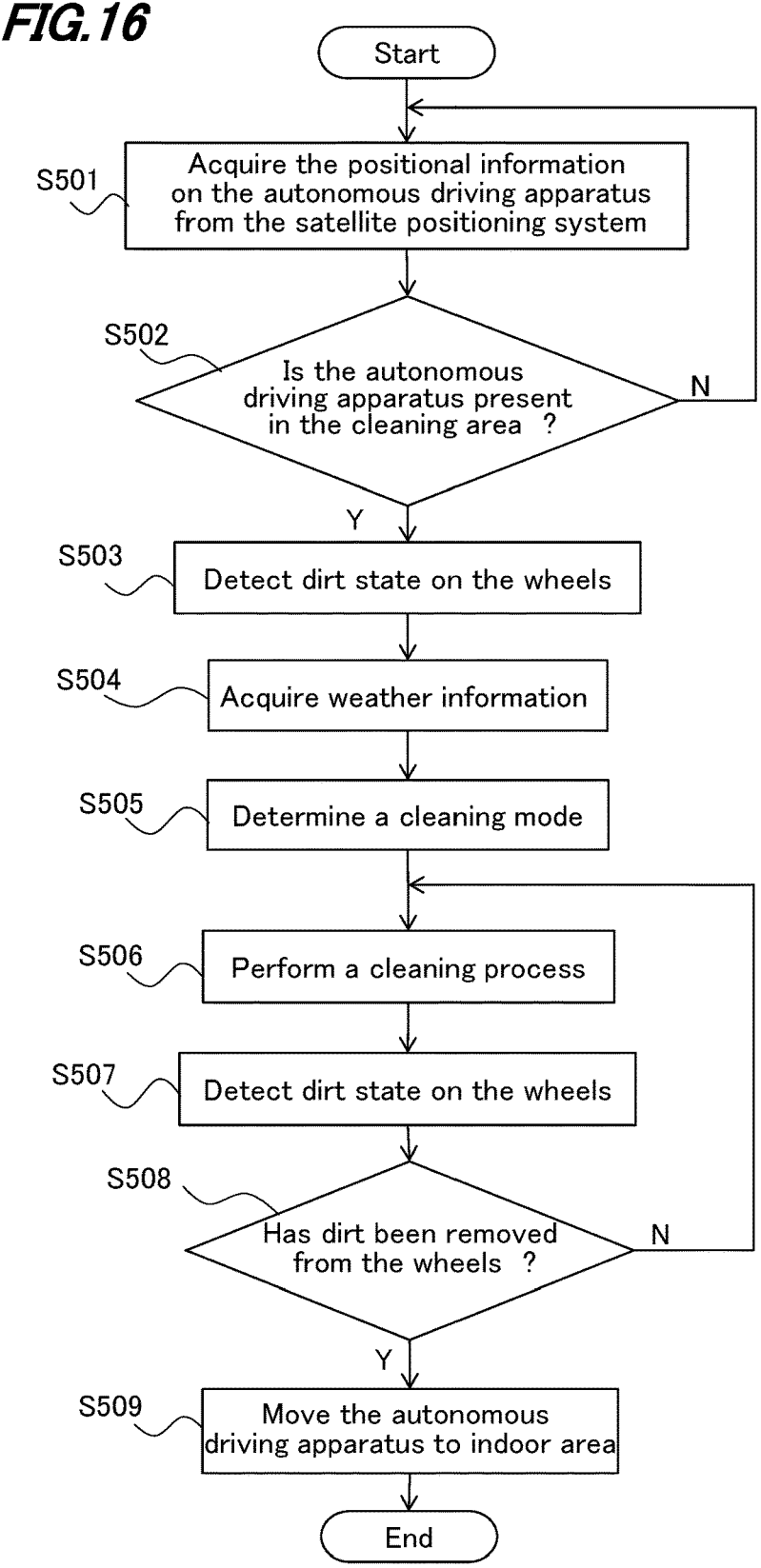
FIG. 16 is a flow chart for illustrating the steps for executing a clearing process of the wheels of the autonomous driving apparatus by the wheel cleaning system.

FIG. 16 is a flow chart for illustrating the steps for performing the clearing process of the wheels of the autonomous driving apparatus by the wheel cleaning system for autonomous driving apparatuses according to the fifth embodiment.

As shown in FIG. 16, as the cleaning process of the wheels 15 by the wheel cleaning system 501 for autonomous driving apparatuses is started, the positional information on the autonomous driving apparatus 510 is acquired first by the satellite positioning system 230 (Step S501).

Then, it is determined whether or not the autonomous driving apparatus 510 is present in the cleaning area 20 by the area determinator (position determinator) 222 (Step S502).

When it is determined at Step S502 that no autonomous driving apparatus 510 is present in the cleaning area 20, the operation returns to Step S501.

On the other hand, when it has been determined at Step S502 that the autonomous driving apparatus 510 is present in the cleaning area 20, the dirt sensor 340 detects dirt of the wheels 15 (Step S503).

Then, the weather information acquisition unit 550 (FIG. 15) acquires the weather information on the region (field) where the autonomous driving apparatus 510 is driven (Step S504).

Then, based on the detected result by the dirt sensor 340, the dirt determinator 423 determines the dirt state of the wheels 15, and the cleaning mode determinator 524 (FIG. 15) determines a cleaning mode based on the dirt state of the wheels 15 and the weather information acquired by the weather information acquisition unit 550 (Step S505). Then, the cleaning operation controller 525 performs the cleaning process of the wheels 15 in the determined cleaning mode (Step S506).

In the cleaning process of wheels 15 the autonomous driving apparatus 510 is placed on the cleaning mat 21 around the center of the cleaning area 20 so that dirt of the wheels 15 is removed by performing the cleaning process in the designated cleaning mode.

Then, the dirt sensor 340 detects the dirt state of the wheels (Step S507) after the cleaning process, and the dirt determinator 423 determines whether or not dirt has been removed from the wheels 15 (Step S508).

When it is determined at Step S508 that dirt of the wheels 15 has not yet been removed, the operation goes to Step S506 and the cleaning process is performed once again.

On the other hand, when it is determined at Step S508 that dirt of the wheels 15 has been removed, the autonomous driving apparatus 510 is moved to the indoor area 40 (Step S509).

In this way, it possible to readily remove dirt by performing the cleaning process in the optimal cleaning mode in accordance with the dirt state of wheels 15 of the autonomous driving apparatus 510. Thus, the autonomous driving apparatus 510 can be made to enter the indoor area 40 in a state that the wheels are cleaned up by removing the dirt.

According to the above-mentioned configuration of the fifth embodiment, the wheel cleaning system 501 of the autonomous driving apparatus 510 having the wheels 15 and capable of driving autonomously based on peripheral information has a cleaning area 20 for cleaning the wheels 15 of the autonomous driving apparatus 510. The cleaning area 20 is equipped with the cleaning mat 21 for cleaning the wheels 15 by rotating the wheels and rubbing the wheels against the mat. The control unit 520 controls the operation of the autonomous driving apparatus 510 so as to perform the cleaning process in the cleaning area 20 based on the optimal cleaning mode according to the dirt state of the wheels 15 and a weather state of the region where the autonomous driving apparatus 510 drives. As a result, the wheel cleaning system 501 can readily remove dirt from the wheels 15.

Meanwhile, the satellite positioning system 230 may be provided in the control unit 520.

Though in the above embodiments the position detecting device for detecting the autonomous driving apparatus residing in the cleaning area 20 employs the cleaning area detector 130 (FIG. 3) or the satellite positioning system 230 (FIGS. 6, 9, 12, 15), the position detecting device of the present invention should not limited to these. Other detecting means such as infrared sensors and others may be used to detect the positional information of the autonomous driving apparatus 510. This configuration will be described below as the sixth embodiment.

The Sixth Embodiment

Next, the sixth embodiment of the present invention will be described with reference to the drawings.

Figure 17:
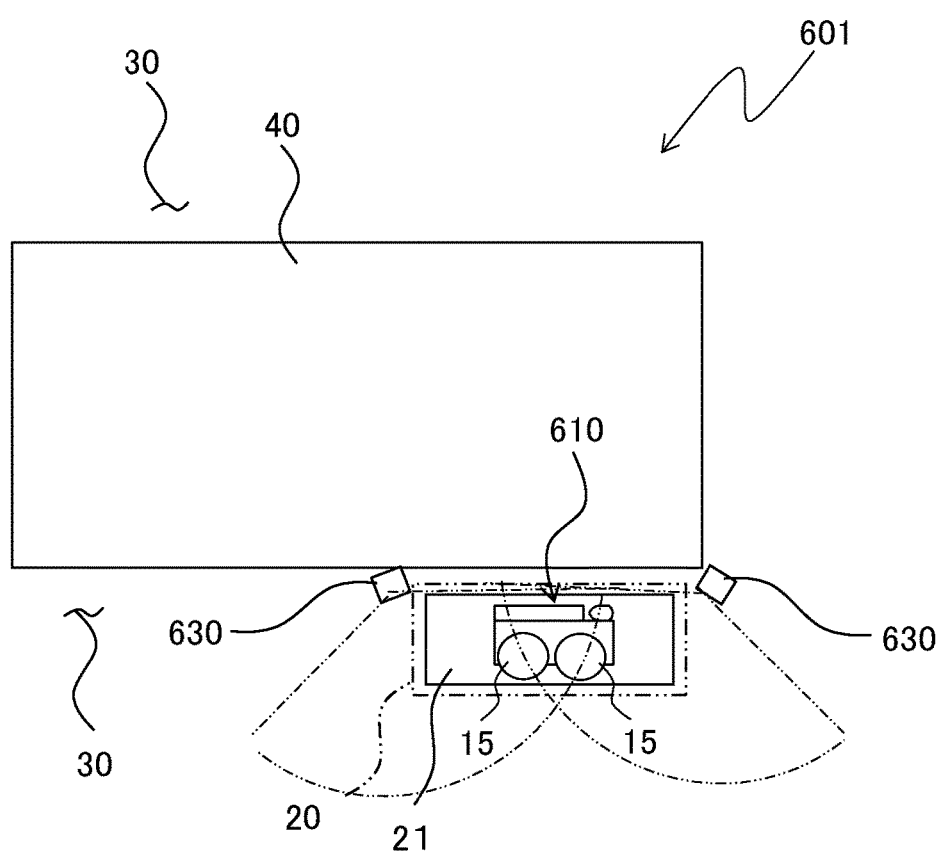
FIG. 17 is an illustrative diagram showing an overall configuration of a wheel cleaning system for autonomous driving apparatuses according to a sixth embodiment of the present invention.
Figure 18:
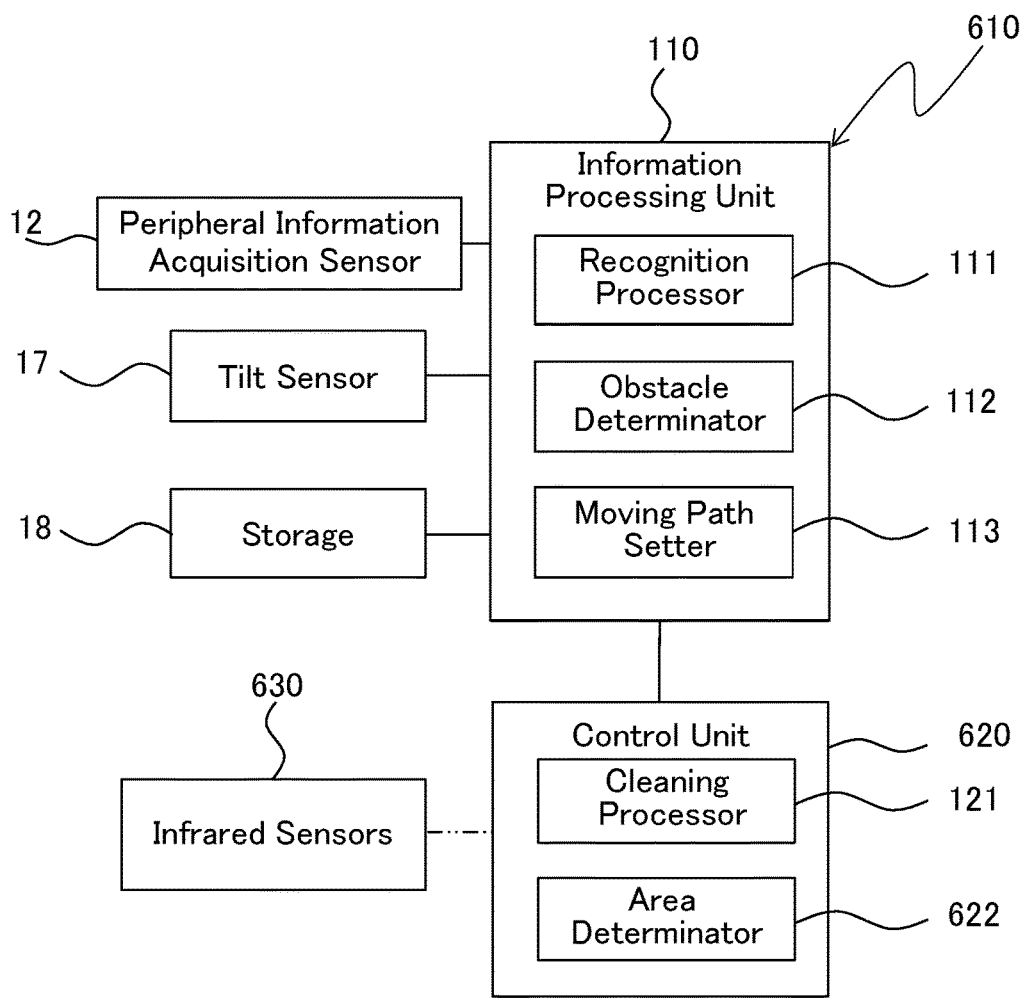
FIG. 18 is a block diagram showing an electric configuration of a control unit of the autonomous driving apparatus.

FIG. 17 is an illustrative diagram showing an overall configuration of a wheel cleaning system for the autonomous driving apparatus according to the sixth embodiment of the present invention. FIG. 18 is the block diagram showing the electric configuration of the control unit of the autonomous driving apparatus.

Here, as to the wheel cleaning system of the autonomous driving apparatus in the sixth embodiment, the same components as those of the wheel cleaning system of the autonomous driving apparatus of the second embodiment are allotted with the same reference numerals and description of them is omitted.

The wheel cleaning system 601 of the autonomous driving apparatus according to the sixth embodiment adopts, as shown in FIGS. 17 and 18, infrared sensors 630, instead of the satellite positioning system 230 (FIG. 6) for detecting the positional information of the autonomous driving apparatus of the second embodiment.

As shown in FIG. 17, a pair of infrared sensors 630 are arranged on both the left and right sides of the cleaning area 20 to detect the positional information of the autonomous driving apparatus 610 that approaches and enters the cleaning area 20.

In the sixth embodiment the control unit 620 includes a cleaning processor 121 and an area determinator 622 and has a function of performing the cleaning process for the wheels 15 in addition to the function of controlling the drive of the autonomous driving apparatus 610.

The area determinator (position detector) 622, based on the detected result of the positional information by the infrared sensors 630 at two sites, determines a position where the autonomous driving apparatus 610 resides in the cleaning area 20.

The positional information in the cleaning area 20 is defined beforehand in association with the detected position in the detecting area of two infrared sensors 630. It is possible to acquire the positional information of the autonomous driving apparatus 610 by detecting the autonomous driving apparatus 610 by using infrared sensors 630 at two sites.

Next, the steps of the cleaning process of wheels 15 of the autonomous driving apparatus 610 by the wheel cleaning system 601 of the autonomous driving apparatus of the sixth embodiment will be described with a flow chart.

Figure 19:
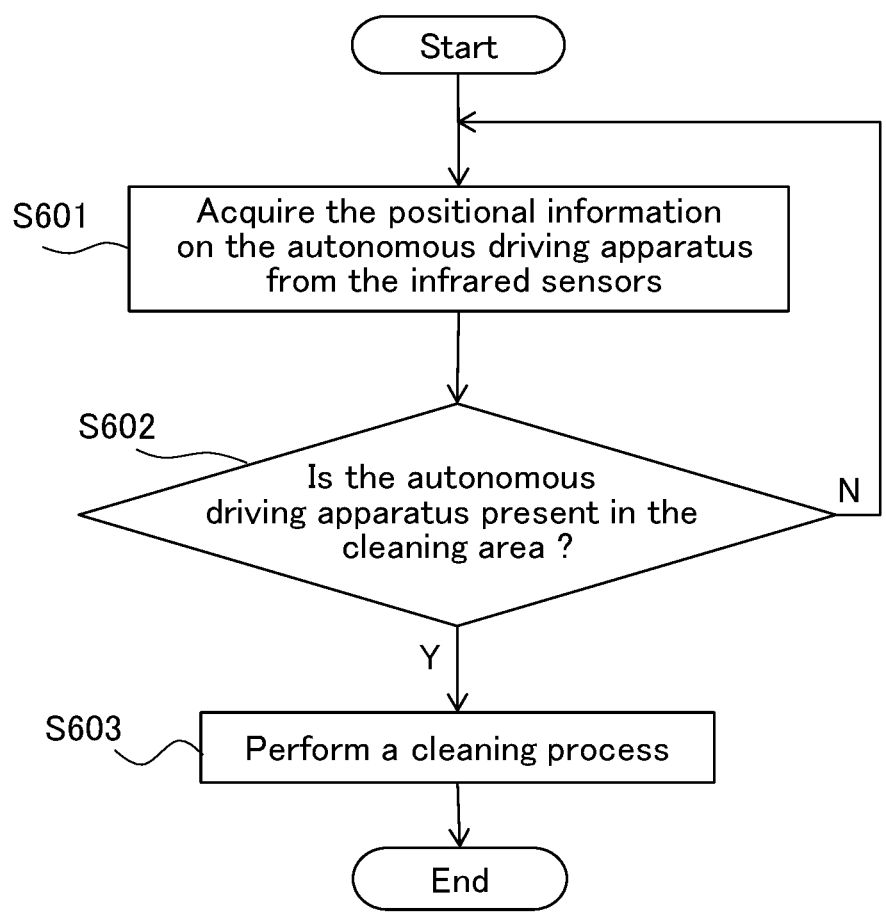
FIG. 19 is a flow chart for illustrating the steps for executing a clearing process of the wheels of an autonomous driving apparatus by the wheel cleaning system.

FIG. 19 is a flow chart for illustrating the steps for performing the clearing process of the wheels of the autonomous driving apparatus by the wheel cleaning system for autonomous driving apparatuses according to the sixth embodiment.

As shown in FIG. 19, as the cleaning process of the wheels 15 by the wheel cleaning system 601 for autonomous driving apparatuses is started, the positional information on the autonomous driving apparatus 610 is acquired first by the infrared sensors 630 (FIG. 18) (Step S601).

Then, it is determined whether or not the autonomous driving apparatus 610 is present in the cleaning area 20 (FIG. 17) by the area determinator 622 (FIG. 18) (Step S602).

When it is determined at Step S602 that no autonomous driving apparatus 610 is present in the cleaning area 20, the operation returns to Step S601.

On the other hand, when it has been determined at Step S602 that the autonomous driving apparatus 610 is present in the cleaning area 20, the cleaning processor 121 (FIG. 18) switches the operation mode of the autonomous driving apparatus 610 from the drive mode to the cleaning mode for performing a cleaning process of wheels 15 to perform the cleaning process of wheels 15 (Step S603).

In the cleaning process of wheels 15, the autonomous driving apparatus 610 is turned round at a fixed position on the cleaning mat 21 around the center of the cleaning area 20 for a predetermined period of time so as to remove dirt from the wheels 15.

In this way, it possible to readily remove dirt of wheels 15 of the autonomous driving apparatus 610.

According to the above-mentioned configuration of the sixth embodiment, the wheel cleaning system 601 of the autonomous driving apparatus 610 having the wheels 15 and capable of driving autonomously based on peripheral information has a cleaning area 20 for cleaning the wheels 15 of the autonomous driving apparatus 610. The cleaning area 20 is equipped with the cleaning mat 21 for cleaning the wheels 15 by rotating the wheels and rubbing the wheels against the mat. The control unit 520 controls the operation of the autonomous driving apparatus 610 so as to perform the cleaning process of the wheels 15 in the cleaning area 20. As a result, the wheel cleaning system 601 can readily remove dirt from the wheels 15. Thus, it is possible to clean the wheels 15 by rubbing the wheels 15 against the cleaning mat 21 when, for example, the autonomous driving apparatus 610 with the wheels 15 soiled after travel in the outdoor area 30 enters the indoor area 40 from the outdoor area 30. Accordingly, it is possible for the autonomous driving apparatus 610 to clean the wheels with a simple arrangement without use of a dedicated cleaning device and enter the indoor area 40 without making itself dirty once again.

Meanwhile, it is possible to provide the infrared sensors 630 in the autonomous driving apparatus 610 so as to acquire the positional information of the autonomous driving apparatus 610 based on the peripheral information.

In the above embodiments, in a case where the drive source of the autonomous driving apparatus uses drive motors, the autonomous driving apparatus may be configured, for example, to wait before the cleaning area 20 or generate an alarm to indicate replacement of the battery if it is difficult to perform a cleaning process of the wheels because of a lower amount of charge in the storage battery (rechargeable battery) when the driving motor is driven.

Further, in the above-described embodiments, the cleaning mat 21 with fibers planted thereon is provided in the cleaning area 20. As a configuration of the cleaning mat 21, fibers of different lengths may be planted so as to give variation to the force acting on the surface of the wheels 15, thereby remove dirt effectively.

When the autonomous driving apparatus is turned at a fixed position, large torque is needed to oppose the friction between the wheels and the cleaning mat. Therefore, it is preferable that the cleaning mat is configured to rub the wheels with low frictional force. Accordingly, the cleaning mat 21 is preferably formed with strong elastic low-frictional fiber.

In order to remove dirt adhering to the mat, the cleaning mat 21 may have a structure for circulating water inside the mat so that water with mud and other particles can be drained out to another place by circulating water supplied from a hose or the like that is connected to the structure. This cleaning process to clean the cleaning mat may be automatically done at regular intervals.

Further, the cleaning mat 21 may be made connectable and separable so that only the dirty part can be replaced.

Also, the cleaning mat 21 may be configured to be detectable by the satellite positioning system or a coil etc. that detect change of radio waves. This configuration makes it possible to confirm the presence of the cleaning mat 21 in the cleaning area 20. For example, if no cleaning mat 21 is present in the cleaning area 20, the autonomous driving apparatus may be made to wait or an alarm may be generated.

The program to be operated in each device of the embodiment may be a program (program that makes a computer function) for controlling a CPU or the like so as to realize the functions of the embodiments described above. The information to be handled in these devices is temporarily stored in temporary memory (e.g., RAM (Random Access Memory) at the time of processing, then is stored into storages such as various kinds of ROM (Read Only Memory) and/or HDDs, and is read out, modified and written in by the CPU, as necessary.

Herein, the recording medium for storing the program may be any of semiconductor mediums (e.g., ROM, non-volatile memory card, etc.), optical recording mediums/ magneto optical mediums (e.g., DVD (Digital Versatile Disc), MO (Magneto Optical Disc), MD (Mini Disc), CD (Compact Disc), BD (Blu-ray disc) and the like), magnetic recording mediums (e.g., magnetic tape, flexible disc, etc.), and the like. Further, the functions of the above-described embodiments are not only realized by executing the loaded program, but the functions of the present invention may also be realized in accordance with the instructions of the program being executed in cooperation with an operating system, another application program or the like.

To put the product on the market, the program may be stored on a removable storing medium, or may be transferred to a server computer by way of a network such as the Internet or the like. In this case, it goes without saying that the storage device of the server computer is also included in the present invention.

Further, the whole or part of each device in the above-described embodiments may also be typically realized by an LSI (Large Scale Integration) as an integrated circuit. The functional block of each device may be given individually in the form of a chip, or the whole or part may be integrated into a chip. The method of circuit integration may be realized in the form of a dedicated circuit or general purpose processing unit, not limited to LSI. It goes without saying that if a technology of circuit integration replacing LSI technologies appears with the progress of semiconductor technologies, the integrated circuit based on that technology can also be used.

Further, the present invention should not be limited to the above-described embodiments, and various changes can be made within the scope of claims. That is, any embodied mode obtained by combination of technical means modified as appropriate without departing from the scope of the invention should be included in the technical scope of the present invention.

DESCRIPTION OF REFERENCE NUMERALS 1, 201, 301, 401, 501, 601 wheel cleaning system
10, 210, 310, 410, 510, 610 autonomous driving apparatus
15 wheels
20 cleaning area
21 cleaning mat
30 outdoor area
40 indoor area
120, 220, 320, 420, 520, 620 control unit
121, 421, 521 cleaning processor
122, 222, 622 area determinator
130 cleaning area detector (position detecting device)
230 satellite positioning system (position detecting device)
323, 423 dirt determinator
340 dirt sensor
424, 524 cleaning mode determinator
425, 525 cleaning operation controller
550 weather information acquisition unit
630 infrared sensor (position detecting device)

What is claimed is:

1. A driving control apparatus for controlling a driving apparatus, the driving control apparatus comprising:
   a control unit includes:
      a cleaning processor for controlling an operation of the driving apparatus so as to perform a cleaning process on a plurality of wheels of the driving apparatus in a cleaning area; and
      an area determinator for determining the cleaning area,
      wherein the cleaning process is a process for cleaning the wheels by making the driving apparatus itself spin horizontally with respect to the cleaning area to rub the wheels in horizontal directions.

2. The driving control apparatus according to claim 1, further comprising a position detecting device for detecting positional information on the driving apparatus,
   wherein
      the area determinator for determining where the driving apparatus is residing among an outdoor area, an indoor area and a cleaning area, based on a detected result of the position detecting device, and,
      the control unit controls the driving apparatus so as to perform the cleaning process in the cleaning area before the driving apparatus enters the indoor area from the outdoor area.

3. The driving control apparatus according to claim 2, wherein the cleaning area is provided between the outdoor area and the indoor area, and
   the control unit has a cleaning mode for performing the cleaning process and performs the cleaning mode when the driving apparatus enters the cleaning area.

4. The driving control apparatus according to claim 1, wherein the cleaning area has a rubbing member for cleaning the wheels as the wheels turn to rub in horizontal directions against the rubbing member.

5. The driving control apparatus according to claim 4, wherein the cleaning process includes an operation to rub an entire circumference of the wheels by making the driving apparatus itself spin horizontally with respect to the cleaning area on the rubbing member.

6. The driving control apparatus according to claim 1, wherein
   the driving apparatus includes a dirt detector for detecting dirt of the wheels,
   the control unit includes a dirt determinator for determining whether or not a detected value of the dirt of the wheels is equal to or lower than a predetermined value being set beforehand, based on a detected result of the dirt detector, and
   the control unit repeats the cleaning process if the detected value of the dirt of the wheels is not equal to or lower than the predetermined value after the cleaning process has been performed in the cleaning area.

7. The driving control apparatus according to claim 1, wherein
   the driving apparatus includes a dirt detector for detecting dirt of the wheels,
   the cleaning process has a plurality of cleaning modes in accordance with a dirt state on the wheels, and,
   the control unit includes:
      a dirt determinator for determining the dirt state on the wheels based on a detected result of the dirt detector;
      a cleaning mode determinator for determining the cleaning mode to be performed in accordance with the dirt state on the wheels, based on a determined result of the dirt determinator; and
      a cleaning operation controller for controlling the operation of the driving apparatus in accordance with the cleaning mode determined by the cleaning mode determinator.

8. The driving control apparatus according to claim 7, wherein the cleaning process has a plurality of cleaning modes in accordance with weather information on the outdoor area,
   the control unit includes an acquisition function of weather information on the outdoor area, and,
   the cleaning mode determinator has a function for determining the cleaning mode to be performed, in accordance with the weather information.

9. A control method of an driving apparatus, comprising the step of:
   performing a cleaning process for cleaning wheels as the driving apparatus turns the wheels and rubs the wheels against a rubbing member by spinning the driving apparatus itself horizontally with respect to the cleaning area to rub the wheels in horizontal directions in a cleaning area for cleaning the wheels of the driving apparatus.

10. The driving apparatus according to claim 7, wherein the cleaning process has an operation selected from the group consisting of spinning horizontally with respect to the cleaning area intermittent; switching direction of a horizontal spin with respect to the cleaning area; and switching speed of a horizontal spin with respect to the cleaning area.

11. The driving control apparatus according to claim 1, wherein the area determinator determines the cleaning area when there is a change of a driving environment.

12. The driving control apparatus according to claim 11, wherein the change of the driving environment is a change of a road surface.

13. The driving apparatus according to claim 1, wherein the cleaning process for the driving apparatus includes an operation to rub against a rubbing member an entire circumference of the wheels by making the driving apparatus turn left and right wheels of the driving apparatus in opposite directions relative to each other on the cleaning area comprising the rubbing member.

14. A driving control apparatus for controlling a driving apparatus, the driving control apparatus comprising:
- a dirt detector for detecting dirt of wheels for the driving apparatus, and
- a control unit controlling an operation of the driving apparatus to perform a cleaning process for the wheels of the driving apparatus when a detected value of the dirt of the wheels is equal to or higher than a predetermined value being set beforehand, based on a detected result of the dirt detector, wherein the cleaning process is a cleaning the wheels by making the driving apparatus itself spin horizontally with respect to the cleaning area to rub the wheels in horizontal directions.

* * * * *